(12) United States Patent
Furuhata et al.

(10) Patent No.: US 7,149,174 B2
(45) Date of Patent: Dec. 12, 2006

(54) OPTICAL PICKUP

(75) Inventors: Hitoshi Furuhata, Saitama-ken (JP);
Tomotaka Nishimura, Saitama-ken (JP); Hirokatsu Nagatake, Saitama-ken (JP); Akira Miura, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 856 days.

(21) Appl. No.: 10/267,838

(22) Filed: Oct. 10, 2002

(65) Prior Publication Data

US 2003/0099179 A1 May 29, 2003

(30) Foreign Application Priority Data

Oct. 12, 2001 (JP) ............................. 2001-315012
Sep. 26, 2002 (JP) ............................. 2002-280259

(51) Int. Cl.
*G11B 7/00* (2006.01)
(52) U.S. Cl. .............................. 369/112.21; 369/112.28
(58) Field of Classification Search ..................... None
See application file for complete search history.

(56) References Cited

U.S. PATENT DOCUMENTS 5,383,175 A * 1/1995 Finkelstein et al. ......... 369/121
6,026,070 A * 2/2000 Miura et al. ............ 369/112.16
6,556,533 B1 * 4/2003 Fukakusa et al. ....... 369/112.19

* cited by examiner

*Primary Examiner*—Paul W. Huber
(74) *Attorney, Agent, or Firm*—Arent Fox PLLC

(57) ABSTRACT

An optical pickup which appropriately detects reflected light and return light reflected back from an information recording medium even if a laser light B1 emitted from a light source varies in wavelength. The transmittances of a half mirror to the laser light B1 emitted from the light source, and to the reflected light Bwr, Ber or the return light Brr reflected back from the information recording medium are preset according to a predetermined condition, i.e., $Tpc(\lambda c)/Tp(\lambda)=(1-Ts(\lambda)/(1-Tsc(\lambda c))\times(Tsc(\lambda c)/Ts(\lambda))$. Here, $\lambda$ is a predetermined wavelength emitted from a semiconductor laser as the light source, $Ts(\lambda)$ is a transmittance to the laser light B1 with a predetermined polarization, $Tp(\lambda)$ is a transmittance to the reflected light Bwr, Ber or the return light Brr reflected back from the information recording medium when the laser light B1 with the predetermined wavelength $\lambda$ is emitted, $Tsc(\lambda c)$ is a transmittance to the laser light B1 with a wavelength $\lambda c$ when the semiconductor laser varies in wavelength characteristic, and $Tpc(\lambda c)$ is a transmittance to the reflected light Bwr, Ber or the return light Brr reflected back from the information recording medium when the laser light B1 with the wavelength $\lambda c$ is emitted.

24 Claims, 7 Drawing Sheets

OPTICAL PICKUP

BACKGROUND OF THE INVENTION

1. Field of the Invention

The invention relates to an optical pickup for performing optical information writing or information reading on or from such an information recording medium as a compact disc (CD) or a digital versatile disc (DVD).

The present application claims each priority from Japanese Patent Application Nos. 2001-315012 and 2002-280259, the disclosure of which is incorporated herein by reference.

2. Description of the Related Art

The development of large-capacity information recording media such as CDs and DVDs, or that of write-once type or rewritable type CDs and DVDs in particular, has resulted in improved functionality.

FIG. 1 shows the configuration of an optical pickup which has conventionally been used for writing, reading or erasing information on an information recording medium (hereinafter referred to as "disc DSC") such as these CDs or DVDs.

In FIG. 1, when writing information on write-once type or rewritable type disc DSC, S-polarized laser light B1 which is modulated with the information, such as sound data and image data, to be recorded is emitted from a semiconductor laser diode LD. The laser light B1 is reflected/transmitted from/through a half mirror HM.

Reflected light B2 reflected from the half mirror HM passes through a quarter-wavelength plate WLP and an objective lens OBL to create spot write light Bw. The write light Bw is irradiated on the disc DSC for writing information.

Reflected light Bwr, or the reflection resulting from the irradiation onto the disc DSC with the write light Bw, passes through the objective lens OBL and the quarter-wavelength plate WLP. Of the reflected light Bwr incident upon the half mirror HM, light Bwd transmitted through the half mirror HM is converted into a photoelectric conversion signal by an optoelectronic integrated circuit OEIC. Based on a various kind of error signal included in the photoelectric conversion signal, a various kind of control such as a focus servo is conducted in order to adjust the objective lens OBL to an appropriate position.

A part of the laser light B1 is transmitted through the half mirror HM to create partial transmitted light B3, which is detected by a photodiode PD. Based on the detection signal thereof, the semiconductor laser diode LD is feedback-controlled in emission power so that the power of the write light Bw is maintained at an appropriate value while writing information, and also that of the light Bwd received by the optoelectronic integrated circuit OEIC is maintained at an appropriate value to improve an accuracy of the focus servo or the like.

In other words, it is preferable to set the power of the write light Bw at the appropriate value in order to improve the accuracy of the information writing by recording an appropriate record mark or the like. Further, in order to improve the accuracy of the focus servo or the like, it is preferable to maintain the power of the light Bwd received by the optoelectronic integrated circuit OEIC at the appropriate value. For doing so, the semiconductor laser diode LD is feedback-controlled in the emission power based on the detection signal of the photodiode PD, thereby maintaining the both power of the write light Bw and the light Bwd received by the optoelectronic integrated circuit OEIC at the respective appropriate values.

In reading information to reproduce the information already recorded on a read-only type, write-once type, or a rewritable type disc DSC, the S-polarized laser light B1 of certain power is emitted from the semiconductor laser diode LD. The reflected light B2 reflected at the half mirror HM passes through the quarter-wavelength plate WLP and the objective lens OBL to create spot read light Br, with which the disc DSC is irradiated.

Then, the read light Br is reflected from the disc DSC to cause return light Brr which carries the characteristics of the information recorded on the disc DSC. Of the return light Brr returning to the half mirror HM through the objective lens OBL and the quarter-wavelength plate WLP, light Brd transmitted through the half mirror HM is received by the optoelectronic integrated circuit OEIC. As a result, a photoelectric conversion signal (RF signal or the like) carrying the characteristics of the information recorded on the disc DSC is created and supplied to a signal processing circuit such as a decoder circuit for the sake of information reproduction.

Additionally, a various kind of control such as a focus servo and a tracking servo is conducted based on a various kind of error signal included in the photoelectric conversion signal being output from the optoelectronic integrated circuit OEIC to adjust the objective lens OBL at an appropriate position.

In information reading, as with information writing, part of the laser light B1 is transmitted through the half mirror HM to create the partial transmitted light B3, which is detected by the photodiode PD. Based on the detection signal thereof, the semiconductor laser diode LD is feedback-controlled in emission power so that the power of the read light Br and that of the light Brd received by the optoelectronic integrated circuit OEIC are maintained at respective appropriate values during information reading.

In information erasing to erase information already recorded on the rewritable type disc DSC, a power of S-polarized laser light B1 is set so as to erase a record mark recorded on the disc DSC, and the laser light B1 is emitted from the semiconductor laser diode LD. Erase light Be is irradiated onto the disc DSC after passing through the half mirror HM, the quarter-wavelength plate WLP, and then the objective lens OBL as with the above mentioned information writing. Thus, in such a case as a rewritable type disc DSC comprising a record layer formed with, for example, phase change material, a crystalloid of the record mark already recorded on the record layer is changed by the irradiated power to erase information.

Further, in this information erasing also, reflected light Ber reflected from the disc DSC is incident on the optoelectronic integrated circuit OEIC through the objective lens OBL, the quarter-wavelength plate WLP and the half mirror HM to cause photoelectric conversion of light Bed transmitted through the half mirror HM. Based on a various kind of error signal included in the photoelectric conversion signal, a various kind of control such as the focus servo and the tracking servo is conducted in order to adjust the objective lens OBL to an appropriate position.

The part of the laser light B1 is transmitted through the half mirror HM to create the partial transmitted light B3, which is detected by the photodiode PD. Based on the detection signal thereof, the semiconductor laser diode LD is feedback-controlled in the emission power so that the power of the erase light Be and that of the light Bed received by the optoelectronic integrated circuit OEIC are maintained at respective appropriate values during information erasing.

Now, at the occasion of information writing, information erasing or information reading as described above, part of the reflected light Bwr, Ber or the return light Brr may be reflected from the half mirror HM, causing the phenomenon that partial reflected light Hwr, Her or Hrr thereof returns to the emission end of the semiconductor laser diode LD. The quarter-wavelength plate WLP is thus arranged to avoid the adverse effect of the phenomenon.

More specifically, suppose that there were arranged no quarter-wavelength plate WLP. When the S-polarized laser light B1 is emitted from the semiconductor laser diode LD, the reflected light Bwr, Ber or return light Brr form the disc DSC would reach the half mirror HM just as the S-polarized laser light B1 would do so. Besides, the partial reflected light Hwr, Her or Hrr reflected from the half mirror HM would be incident on the emission end of the semiconductor laser diode LD just as is S-polarized. If the partial reflected light Hwr, Her or Hrr S-polarized in the same fashion as the laser light B1 is incident on the emission end of the semiconductor laser diode LD, there would occur such problems that the semiconductor laser diode LD varies in the emission power and that it generates noise-containing laser light B1.

In contrast, given that the quarter-wavelength plate WLP is arranged, the reflected light B2 reflected from the half mirror HM is converted from the S-polarization to a circular polarization when passing through the quarter-wavelength plate WLP. The disc DSC is thus irradiated with the circularly-polarized write light Bw, erase light Be or read light Br. The reflected light Bwr, Ber or return light Brr reflected back from the disc DSC is incident on the quarter-wavelength plate WLP as is circularly polarized. The incident light is converted from the circular polarization to a P-polarization when passing through the quarter-wavelength plate WLP, and reaches the half mirror HM.

Note that in the foregoing conversion from the circular polarization to the P-polarization, the reflected light Bwr, Ber or return light Brr reaching the half mirror HM is P-polarized in a direction 90° different from the direction of polarization of the laser light B1. The partial reflected light Hwr, Her or Hrr reflected from the half mirror HM is thus incident on the emission end of the semiconductor laser diode LD as is P-polarized with 90° difference from the S-polarization of the laser light B1.

Consequently, from the provision of the quarter-wavelength plate WLP, it follows that the partial reflected light Hwr, Her or Hrr P-polarized with the 90° difference from the laser light B1 having the S-polarization is incident on the emission end of the semiconductor laser diode LD. The adverse effect on the semiconductor laser diode LD can thus be reduced to generate the laser light B1 which is low in noise or the like.

As mentioned above, the conventional optical pickup is provided with the quarter-wavelength plate WLP so that the semiconductor laser diode LD operates normally, and further feedback-controls the emission power of the semiconductor laser diode LD based on the detection output from the photodiode Pd so that the disc DSC is irradiated with the write light Bw, erase light Be, or read light Br having an appropriate power, and the light Bwd, Bed, or Brd with each power appropriately maintained is incident on the optoelectronic integrated circuit OEIC.

However, when the laser light Bi may vary in wavelength depending on the potential properties of the semiconductor laser diode LD, such as changes in ambient temperature and internal temperature (hereinafter, referred to as "changes in environmental temperature"), there occurred the following problems to be solved.

That is, when the wavelength of the laser light B1 varies, the properties of the optical elements constituting the optical pickup substantially vary according to the difference in the wavelength of the laser light B1.

In detail, there occurs a problem that each power of the write light Bw, erase light Be, and read light Br is off the appropriate value due to the variation of the wavelength. In addition, each power of the above mentioned light Bwd, Bed, and Brd incident on the optoelectronic integrated circuit OEIC is also off the respective appropriate values so that the accuracy in such controls as the focus servo and the tracking servo is lowered, and also quality of reproduced signals obtained in the information reproduction is lowered.

More specifically, the following problem occurs if the wavelength of the laser light B1 varies to cause variations in the transmittance and the reflectance of the half mirror HM.

That is, suppose that the half mirror HM has a transmittance of Ts when the laser light B1 with the S-polarization which is emitted from the semiconductor laser diode LD is incident thereon, and a transmittance of Tp when the reflected light Bwr, Ber or return light Brr from the quarter-wavelength plate WLP is incident thereon.

Then, when the laser light B1 varies in wavelength depending on such factors as changes in environmental temperature, the half mirror HM varies in those transmittances Ts and Tp according to dependency from the wavelength, thereby causing each power of the light Bwd, Bed or Brd incident on the optoelectronic integrated circuit OEIC to be off the respective appropriate values. In other words, the accuracy of various controls such as the focus servo and the tracking servo is lowered.

SUMMARY OF THE INVENTION

The present invention has been achieved in view of the foregoing conventional problems. It is thus an object of the present invention to provide an optical pickup in which emission power of a light source, such as a semiconductor laser diode, can be detected appropriately, and reflected light and return light reflected back from an information recording medium can be detected appropriately even if the light source emits laser light with variations in wavelength.

According to the first aspect of the present invention, there is provided an optical pickup comprising a light source for emitting S-polarized light intended for writing, reading or erasing information; a beam splitter for reflecting and transmitting said S-polarized light incident at an incident plane thereof from said light source in accordance with a predetermined first reflectance and first transmittance, thereby outputting a first reflected light and a first transmitted light; a quarter-wavelength plate for causing said first reflected light to pass through and to be output toward an information recording medium; detecting means for detecting said first transmitted light to exercise a feedback control on emission power of said light source based on a result of detection; and light receiving means for receiving light reflected back from said information recording medium, passing through said quarter-wavelength plate again, and transmitted through said beam splitter, as said first reflected light is incident on said information recording medium through said quarter-wavelength plate, wherein said beam splitter has said first transmittance and a predetermined second transmittance to the light reflected back from said information recording medium, the respective transmit tances being determined in accordance with a condition given by:

$$Tpc(\lambda c)/Tp(\lambda)=K\times(Tsc(\lambda c)/Ts(\lambda)),$$

where $Ts(\lambda)$ is a transmittance to light of predetermined wavelength $\lambda$ emitted from said light source, $Tsc(\lambda c)$ is a transmittance to light of wavelength $\lambda c$ emitted when said light source varies in wavelength characteristic, $Tp(\lambda)$ is a transmittance to the light reflected back from said information recording medium through said quarter wavelength plate when the light of predetermined wavelength $\lambda$ is emitted from said light source, $Tpc(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-Ts(\lambda))/(1-Tsc(\lambda c))$, or a value falling within a range of 1 and $(1-Ts(\lambda))/(1-Tsc(\lambda c))$.

According to the second aspect of the present invention, there is further provided an optical pickup comprising a light source for emitting S-polarized light intended for writing, reading or erasing information; a beam splitter for reflecting and transmitting said S-polarized light incident at an incident plane thereof from said light source in accordance with a predetermined first reflectance and first transmittance, thereby outputting a first reflected light and a first transmitted light; a quarter-wavelength plate for causing said first transmitted light to pass through and to be output toward an information recording medium; detecting means for detecting said first reflected light to exercise a feedback control on emission power of said light source based on a result of detection; and light receiving means for receiving light reflected back from said information recording medium, passing through said quarter-wavelength plate again, and reflected through said beam splitter, as said first transmitted light is incident on said information recording medium through said quarter-wavelength plate, wherein said beam splitter has said first reflectance and a predetermined second reflectance to the light reflected back from said information recording medium, the respective reflectances being determined in accordance with a condition given by:

$$Rpc(\lambda c)/Rp(\lambda)=K\times(Rsc(\lambda c)/Rs(\lambda)),$$

where $Rs(\lambda)$ is a transmittance to light of predetermined wavelength $\lambda$ emitted from said light source, $Rsc(\lambda c)$ is a transmittance to light of wavelength $\lambda c$ emitted when said light source varies in wavelength characteristic, $Rp(\lambda)$ is a transmittance to the light reflected back from said information recording medium through said quarter wavelength plate when the light of predetermined wavelength $\lambda$ is emitted from said light source, $Rpc(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-Rs(\lambda))/(1-Rsc(\lambda c))$, or a value falling within a range of 1 and $(1-Rs(\lambda))/(1-Rsc(\lambda c))$.

According to the third aspect of the present invention, there is further provided an optical pickup comprising a light source for emitting P-polarized light intended for writing, reading or erasing information; a beam splitter for reflecting and transmitting said P-polarized light incident at an incident plane thereof from said light source in accordance with a predetermined first reflectance and first transmittance, thereby outputting a first reflected light and a first transmitted light; a quarter-wavelength plate for causing said first reflected light to pass through and to be output toward an information recording medium; detecting means for detecting said first transmitted light to exercise a feedback control on emission power of said light source based on a result of detection; and light receiving means for receiving light reflected back from said information recording medium, passing through said quarter-wavelength plate again, and transmitted through said beam splitter, as said first reflected light is incident on said information recording medium through said quarter-wavelength plate, wherein said beam splitter has said first transmittance and a predetermined second transmittance to the light reflected back from said information recording medium, the respective transmittances being determined in accordance with a condition given by:

$$Tsc(\lambda c)/Ts(\lambda)=K\times(Tpc(\lambda c)/Tp(\lambda)),$$

where $Tp(\lambda)$ is a transmittance to light of predetermined wavelength $\lambda$ emitted from said light source, $Tpc(\lambda c)$ is a transmittance to light of wavelength $\lambda c$ emitted when said light source varies in wavelength characteristic, $Ts(\lambda)$ is a transmittance to the light reflected back from said information recording medium through said quarter wavelength plate when the light of predetermined wavelength $\lambda$ is emitted from said light source, $Tsc(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-Tp(\lambda))/(1-Tpc(\lambda c))$, or a value falling within a range of 1 and $(1-Tp(\lambda))/(1-Tpc(\lambda c))$.

In addition, according to the fourth aspect of the present invention, there is provided an optical pickup comprising a light source for emitting P-polarized light intended for writing, reading or erasing information; a beam splitter for reflecting and transmitting said P-polarized light incident at an incident plane thereof from said light source in accordance with a predetermined first reflectance and first transmittance, thereby outputting a first reflected light and a first transmitted light; a quarter-wavelength plate for causing said first transmitted light to pass through and to be output toward an information recording medium; detecting means for detecting said first reflected light to exercise a feedback control on emission power of said light source based on a result of detection; and light receiving means for receiving light reflected back from said information recording medium, passing through said quarter-wavelength plate again, and reflected through said beam splitter, as said first transmitted light is incident on said information recording medium through said quarter-wavelength plate, wherein said beam splitter has said first reflectance and a predetermined second reflectance to the light reflected back from said information recording medium, the respective reflectances being determined in accordance with a condition given by:

$$Rsc(\lambda c)/Rs(\lambda)=K\times(Rpc(\lambda c)/Rp(\lambda)),$$

where $Rp(\lambda)$ is a transmittance to light of predetermined wavelength $\lambda$ emitted from said light source, $Rpc(\lambda c)$ is a transmittance to light of wavelength $\lambda c$ emitted when said light source varies in wavelength characteristic, $Rs(\lambda)$ is a transmittance to the light reflected back from said information recording medium through said quarter wavelength plate when the light of predetermined wavelength $\lambda$ is emitted from said light source, $Rsc(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-Rp(\lambda))/(1-Rpc(\lambda c))$, or a value falling within a range of 1 and $(1-Rp(\lambda))/(1-Rpc(\lambda c))$.

Further, according to the fifth aspect of the present invention, there is provided an optical pickup comprising a light source for emitting obliquely-polarized light intended for writing, reading or erasing information; a beam splitter for reflecting and transmitting said obliquely-polarized light incident at an incident plane thereof from said light source in accordance with a predetermined first reflectance and first transmittance, thereby outputting a first reflected light and a first transmitted light; a quarter-wavelength plate for causing said first reflected light to pass through and to be output toward an information recording medium; detecting means for detecting said first transmitted light to exercise a feedback control on emission power of said light source based on a result of detection; and light receiving means for receiving light reflected back from said information recording medium, passing through said quarter-wavelength plate again, and transmitted through said beam splitter, as said first reflected light is incident on said information recording medium through said quarter-wavelength plate, wherein said beam splitter has said first transmittance and a predetermined second transmittance to the light reflected back from said information recording medium, the respective transmittances being determined in accordance with a condition given by:

$$T_{2c}(\lambda c)/T_2(\lambda)=K \times (T_{1c}(\lambda c)/T_1(\lambda)),$$

where $T_1(\lambda)$ is a transmittance to light of predetermined wavelength $\lambda$ emitted from said light source, $T_{1c}(\lambda c)$ is a transmittance to light of wavelength $\lambda c$ emitted when said light source varies in wavelength characteristic, $T_2(\lambda)$ is a transmittance to the light reflected back from said information recording medium through said quarter wavelength plate when the light of predetermined wavelength $\lambda$ is emitted from said light source, $T_{2c}(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-T_1(\lambda))/(1-T_{1c}(\lambda c))$, or a value falling within a range of 1 and $(1-T_1(\lambda))/(1-T_{1c}(\lambda c))$.

Additionally, according to the sixth aspect of the present invention, there is provided an optical pickup comprising a light source for emitting obliquely-polarized light intended for writing, reading or erasing information; a beam splitter for reflecting and transmitting said obliquely-polarized light incident at an incident plane thereof from said light source in accordance with a predetermined first reflectance and first transmittance, thereby outputting a first reflected light and a first transmitted light; a quarter-wavelength plate for causing said first transmitted light to pass through and to be output toward an information recording medium; detecting means for detecting said first reflected light to exercise a feedback control on emission power of said light source based on a result of detection; and light receiving means for receiving light reflected back from said information recording medium, passing through said quarter-wavelength plate again, and reflected through said beam splitter, as said first transmitted light is incident on said information recording medium through said quarter-wavelength plate, wherein said beam splitter has said first reflectance and a predetermined second reflectance to the light reflected back from said information recording medium, the respective reflectances being determined in accordance with a condition given by:

$$R_{2c}(\lambda c)/R_2(\lambda)=K \times (R_{1c}(\lambda c)/R_1(\lambda)),$$

where $R_1(\lambda)$ is a transmittance to light of predetermined wavelength $\lambda$ emitted from said light source, $R_{1c}(\lambda c)$ is a transmittance to light of wavelength $\lambda c$ emitted when said light source varies in wavelength characteristic, $R_2(\lambda)$ is a transmittance to the light reflected back from said information recording medium through said quarter wavelength plate when the light of predetermined wavelength $\lambda$ is emitted from said light source, $R_{2c}(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-R_1(\lambda))/(1-R_{1c}(\lambda c))$, or a value falling within a range of 1 and $(1-R_1(\lambda))/(1-R_{1c}(\lambda c))$.

BRIEF DESCRIPTION OF THE DRAWINGS

These and other objects and advantages of the present invention will become clear from the following description with reference to the accompanying drawings, wherein:

FIGS. 7(*b*) and 7(*c*) are diagrams showing the configuration of an optical pickup according to the third embodiment of the present invention, respectively.

DETAILED DESCRIPTION OF THE PREFERRED EMBODIMENTS

Hereinafter, preferred embodiments of the present invention will be described with reference to the drawings.

(First Embodiment)

Figure 1:
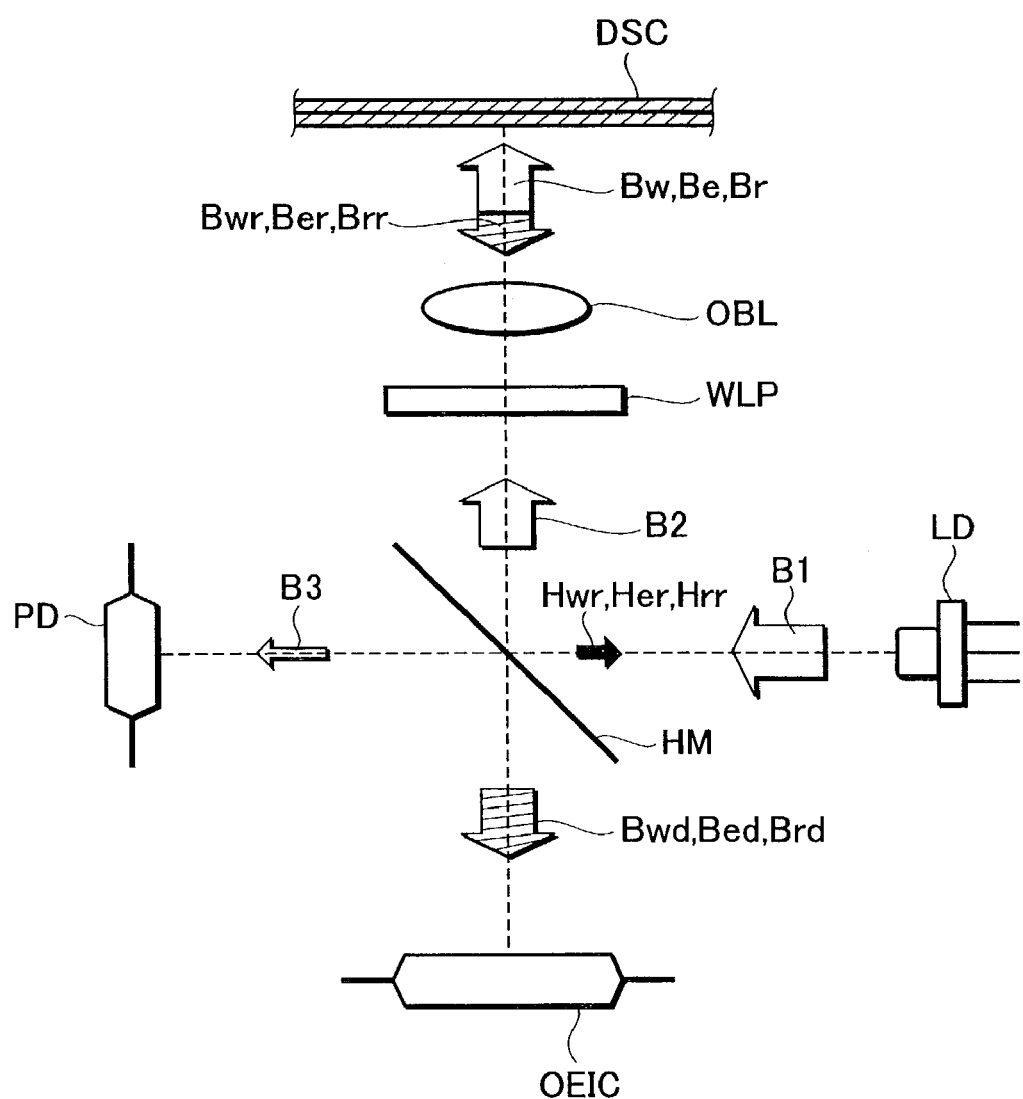
FIG. 1 is a diagram showing the configuration of a conventional optical pickup.
Figure 2:
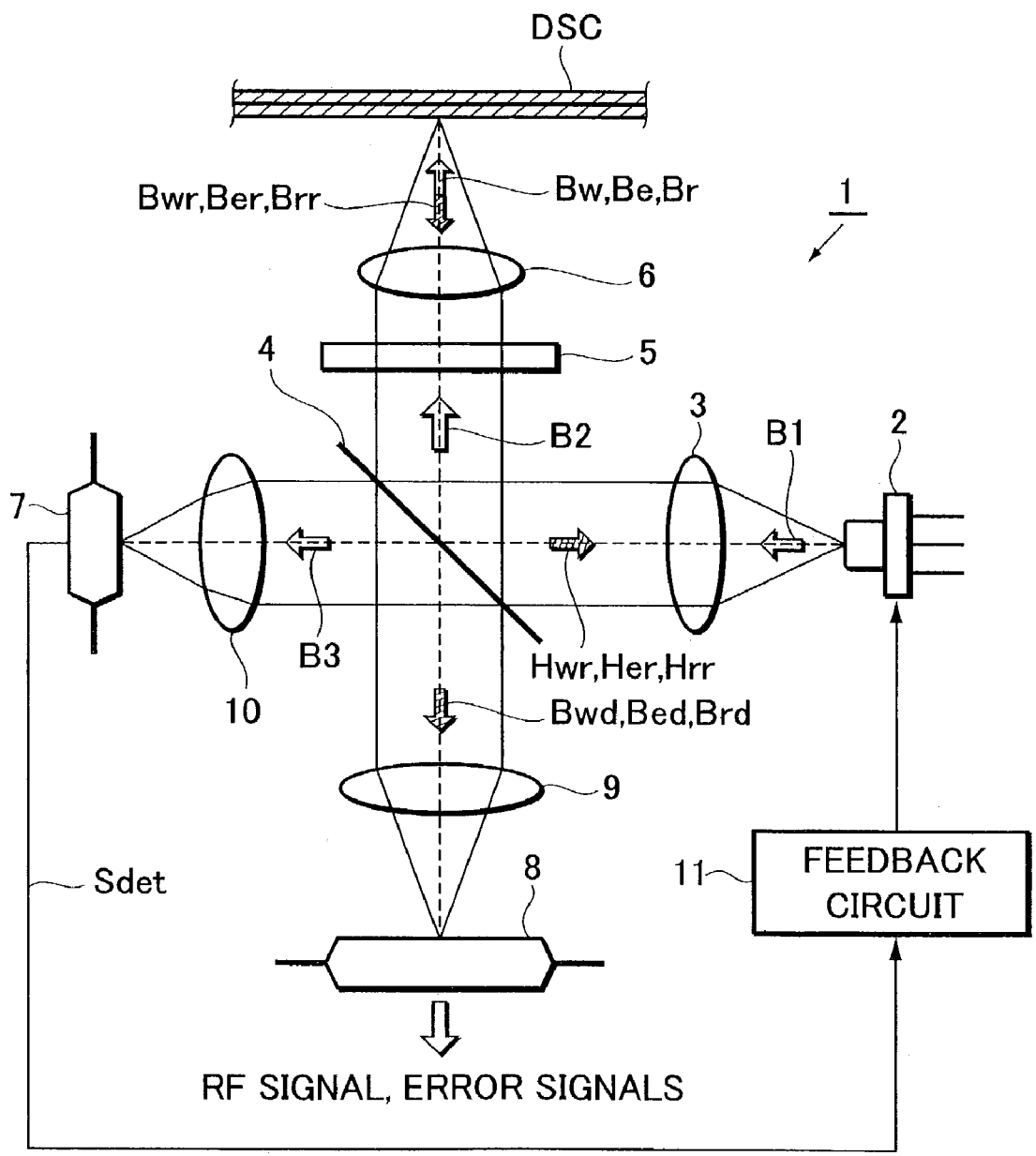
FIG. 2 is a diagram showing the configuration of an optical pickup according to the first embodiment of the present invention.

FIG. 2 is a diagram showing the configuration of an optical pickup 1 according to the first embodiment.

In FIG. 2, the optical pickup 1 includes a semiconductor laser 2 as a light source, a collimator lens 3, a half mirror 4 as a beam splitter, a quarter-wavelength plate 5, an objective lens 6, a light detecting device 7, a light receiving device 8, and condenser lenses 9 and 10.

The semiconductor laser 2 emits a laser light B1 as an emission light, which has a linear polarization (S-polarization) against an incident plane of the half mirror 4. Moreover, an emission power thereof is controlled by the so-called power strategy, and a feedback-control as mentioned later.

In writing information to a write-once disc such as a CD-R or a DVD-R or a rewritable disc such as a CD-RW or a DVD-RW, the semiconductor laser 2 emits S-polarized laser light B1 (the so-called laser light for writing) which is modulated in accordance with the information to be recorded, and has a predetermined power.

Additionally, in reading information from a read-only disc such as a CD-ROM or a DVD-ROM, or in reading the information already recorded on the write-once disc or rewritable disc mentioned above, the semiconductor laser 2 emits S-polarized laser light (the so-called laser light for reading) B1 of predetermined power for a reading operation.

Further, in erasing information already recorded on the rewritable disc also, the semiconductor laser 2 emits S-polarized laser light (the so-called laser light for erasing) B1 of predetermined power for an erasing operation.

The collimator lens 3 is provided so that this optical pickup 1 has the configuration of so-called infinite design. Through the collimator lens 3, the laser light B1 emitted from the semiconductor laser 2 is converted into parallel light and incident on the incident plane of half mirror 4.

The half mirror 4 has a predetermined reflectance Rs and transmittance Ts to the S-polarized laser light (specifically, laser light for writing, erasing and reading) B1 incident through the collimator lens 3.

In other words, the half mirror 4 has the predetermined reflectance Rs and transmittance Ts to the laser light B1 including the linear polarization (S-polarization) perpendicular to the incident plane.

Consequently, the half mirror 4 reflects the laser light B1 with the reflectance Rs and supplies reflected light B2 as the first reflected light to the quarter-wavelength plate 5. It also transmits part of the laser light B1 with the transmittance Ts so that partial transmitted light B3 as the first transmitted light is condensed through the condenser lens 10 and detected by the light detecting device 7.

Moreover, for convenience of explanation, the reflectance Rs and the transmittance Ts for the laser light B1 are called the first reflectance and the first transmittance, respectively.

Further, as will be described later, reflected light Bwr reflected back from the disc DSC in information writing, reflected light Ber reflected back from the disc DSC in information erasing or return light Brr reflected back from the disc DSC in information reading is incident on the half mirror 4 through the quarter-wavelength plate 5. The half mirror 4 has a predetermined reflectance Rp and transmittance Tp to the reflected light Bwr, Ber or return light Brr which is P-polarized through the quarter-wavelength plate 5.

That is, the half mirror 4 has the predetermined reflectance Rp and transmittance Tp to the reflected light Bwr, Ber or return light Brr which is converted into a linear polarization (P-polarization) through the quarter-wavelength plate 5, being parallel to the incident plane.

Consequently, the half mirror 4 transmits the P-polarized reflected light Bwr, Ber or return light Brr incident through the quarter-wavelength plate 5 with the transmittance Tp so that the transmitted light Bwd, Bed or Brd as the second transmitted light is condensed through the condenser lens 9 and received by the light receiving device 8. It also reflects the foregoing reflected light Bwr, Ber or return light Brr with the reflectance Rp to output the reflected light Hwr, Her or Hrr (hereinafter referred to as "noise light") as the second reflected light toward the collimator lens 3.

Moreover, for convenience of explanation, the reflectance Rp and the transmittance Tp for the reflected light Bwr, Ber or return light Brr are called the second reflectance and the second transmittance, respectively.

The quarter-wavelength plate 5 converts the S-polarized reflected light B2 incident from the side of the half mirror 4 into circular polarization and outputs the resultant toward the objective lens 6. It also converts the circularly-polarized reflected light Bwr, Ber or return light Brr to be incident from the side of the objective lens 6 into P-polarization and outputs the resultant toward the half mirror 4.

Consequently, the quarter-wavelength plate 5 circularly polarizes the S-polarized reflected light B2, and P-polarizes the circularly-polarized reflected light Bwr, Ber or return light Brr. As a result, a polarized direction of the reflected light Bwr, Ber or return light Brr after P-polarized through the quarter-wavelength plate 5 is resulted in being substantially 90° different (different by 90° in phase) from that of the laser light B1 with the S-polarization which is emitted from the semiconductor laser 2.

Therefore, the reflected light Bwr, Ber or return light Brr passing through the quarter-wavelength plate 5 is incident on the half mirror 4 with the polarized direction substantially 90° different from that of the laser light B1.

The objective lens 6 converges the circularly-polarized reflected light B2 passing through the quarter-wavelength plate 5 into a light beam intended for writing information (hereinafter, referred to as "write light") Bw, with which the write-once or rewritable disc DSC mentioned above is irradiated for writing information.

In erasing information, the objective lens 6 converges the circularly-polarized reflected light B2 passing through the quarter-wavelength plate 5 into a light beam intended for erasing information (hereinafter referred to as "erase light") Be, with which the write-once or rewritable disc DSC mentioned above is irradiated for erasing information (record marks) recorded on the disc DSC.

In reading information, the objective lens 6 converges the circularly-polarized reflected light B2 into a light beam intended for reading information (hereinafter referred to as "read light") Br, with which the read-only, write-once, or rewritable disc DSC mentioned above is irradiated to read the information recorded on the disc DSC.

Furthermore, as mentioned above, the objective lens 6 condenses the reflected light Bwr resulting from the incidence of the write light Bw on the disc DSC, the reflected light Ber resulting from the incidence of the erase light Be on the disc DSC or the return light Brr resulting from the incidence of the read light Br on the disc DSC, and outputs the resultant toward the quarter-wavelength plate 5.

The light detecting device 7 is formed with photoelectric conversion elements such as phototransistor or photodiode to photoelectrically convert the partial transmitted light B3 which is incident through the aforementioned condenser lens 10, thereby outputting a detection signal Sdet which shows a value corresponding to the power of the laser light B1 emitted from the semiconductor laser 2. Then, the detection signal Sdet is supplied to a feedback circuit 11, which automatically feedback-controls the emission power of the semiconductor laser 2 so that the difference between a target value established in advance and the value of the detection signal Sdet becomes 0.

The light receiving device 8 has a plurality of split photoreceptive surfaces or photoelectric conversion planes. The light Bwd, Bed or Brd incident through the condenser lens 9 is received with split by these photoreceptive surfaces for photoelectric conversion. As a result, the light receiving device 8 outputs an RF signal intended for information reproduction and error signals for indicating errors such as a focus error and a tracking error.

The RF signal is supplied to a signal processing circuit (not shown), such as a decoder circuit, for information reproduction. The error signals are supplied to the feedback circuit 11. Under the control of the feedback circuit 11, predetermined focus or tracking actuators (not shown) are driven to exercise such servo control as adjusting the position of the objective lens 6 with respect to the disc DSC.

The aforementioned first reflectance Rs and first transmittance Ts of the half mirror 4 to the S-polarized laser light B1 are substantially set as Ts=1−Rs. Specifically, the half mirror 4 is designed to decrease attenuation generated when the laser light B1 is reflected or transmitted as much as possible, thereby obtaining the relationship of Ts=1−Rs.

Further, the intensity of the transmitted light is set to become smaller than that of the reflected light. That is, according to the setting, when the laser light B1 is incident, most of the laser light B1 is put to effective use as the write light Bw, erase light Be or read light Br while only part of the laser light B1 is detected as the transmitted light B3 by the light detecting device 7.

Additionally, the aforementioned reflectance Rp and transmittance Tp of the half mirror 4 to the P-polarized reflected light Bwr, Ber or P-polarized return light Brr are substantially set as Tp=1−Rp. That is, as well as the foregoing relationship of Ts=1−Rs, the half mirror 4 is designed to decrease the attenuation to the reflected light Bwr, Ber or return light Brr as much as possible, thereby obtaining the relationship of Tp=1−Rp.

The half mirror 4 is also designed for the relationship given by the following Eq. (1):

$$Tpc(\lambda c)/Tp(\lambda)=\{1-Ts(\lambda)\}/\{1-Tsc(\lambda c)\}\times Tsc(\lambda c)/Ts(\lambda) \quad (1)$$

In Eq. (1), the coefficients $Ts(\lambda)$ and $Tp(\lambda)$ are the ideal first transmittances Ts and the ideal second transmittances Tp to be determined according to the design specifications. For example, the transmittances are for situations where the semiconductor laser 2 emits the laser light B1 of wavelength $\lambda$ at room temperature of 25° C.

The variables $Tsc(\lambda c)$ and $Tpc(\lambda c)$ are the first transmittance Ts and the second transmittance Tp for situations where the semiconductor laser 2 varies in wavelength characteristic and the wavelength of the laser light B1 shifts to a wavelength of $\lambda c$ as the environmental temperature deviates from the room temperature of 25° C.

Now, description of the concrete design procedure will be given for more details of the transmittance characteristics of the half mirror 4. Initially, the optical pickup 1 shown in FIG. 2 is formed by using a half mirror 4 which has the first and second transmittances of $Ts(\lambda)$ and $Tp(\lambda)$ respectively, when the semiconductor laser 2 emits the laser light B1 of wavelength $\lambda$.

Next, the environmental temperature is experimentally changed in various ways so that the wavelength of the laser light B1 shifts to each different wavelengths $\lambda c$ accordingly. Then, the first transmittance $Tsc(\lambda c)$ or the second transmittance $Tpc(\lambda c)$ is actually measured.

For example, the wavelength $\lambda c$ of the laser light B1 is changed in various ways, and the transmittance $Tsc(\lambda c)$ is measured for actual values at the respective wavelengths $\lambda c$. The resultant characteristic curve Ls ($Tsc(\lambda c)$) shows such variations of the first transmittance $Tsc(\lambda c)$ with respect to the wavelength $\lambda c$ as illustrated in FIG. 3.

Next, each value of transmittances $Tsc(\lambda c)$ on the characteristic curve Ls ($Tsc(\lambda c)$) are substituted for the foregoing Eq. (1) to obtain the characteristic curve Lp ($Tpc(\lambda c)$) showing each value of the second transmittance $Tpc(\lambda c)$ with respect to the wavelength $\lambda c$.

Based on the characteristic curves Ls ($Tsc(\lambda c)$) and Lp ($Tpc(\lambda c)$) the half mirror 4 generating the first transmittances $Tsc(\lambda c)$ and the second transmittance $Tpc(\lambda c)$ which correspond to the respective wavelengths $\lambda c$ is formed to produce the half mirror 4 which can suppress the effect of wavelength variations of the laser light B1.

Figure 3:
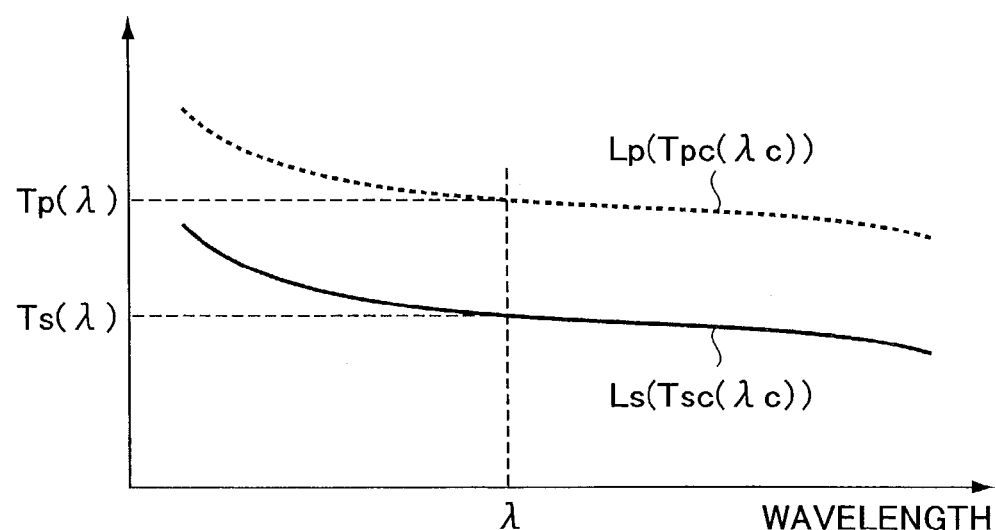
FIG. 3 is a diagram for explaining the condition for determining the characteristics of a half mirror as a beam splitter.

Incidentally, the characteristic curve Ls ($Tsc(\lambda c)$) which shows the variations of the first transmittance $Tsc(\lambda c)$ as illustrated in FIG. 3 need not be always obtained through actual measurement when the characteristic curve Lp (Tpc ($\lambda c$)) for showing the variations of the second transmittance $Tpc(\lambda c)$ is measured instead. In this case, each value of the second transmittance $Tpc(\lambda c)$ actually measured can be substituted into the foregoing Eq. (1) to obtain the characteristic curve Ls ($Tsc(\lambda c)$) which shows the variations of the first transmittance $Tsc(\lambda c)$.

Moreover, a detailed explanation regarding the production of the half mirror 4 is omitted, but simply explaining, two right-angled prisms with respective slopes, for example, are used for producing the half mirror, either slope of which is coated by a dielectric multilayer membrane for bonding the both prisms together to form a cube. More specifically, in the coating, the materials and the structure (the number of layers, or thickness) of the dielectric multilayer membrane are adjusted, so that the foregoing first and second reflectance Rs, Rp and the foregoing transmittance Ts, Tp can be obtained with regard to S-polarized laser light B1 and P-polarized reflected light Bwr, Ber or return light Brr which are incident on the incident plane, namely plane including incident lights and reflected lights.

When the relationship expressed by the foregoing Eq. (1) is thus applied to the half mirror 4, the power of the partial transmitted light B3 can be kept in a correlation with the power of the laser light B1 all the time even if the semiconductor laser 2 varies in the wavelength of the laser light B1 due to changes in environmental temperature or the like.

Consequently, the feedback control on the emission power of the semiconductor laser 2, based on the detection signal Sdet output from the light detecting device 7, can provide the effect of allowing appropriate power setting of the laser light B1.

An additional effect is that the light Bwd, Bed or Brd incident on the light receiving device 8 can be maintained at an appropriate power.

Further, the write light Bw, erase light Be or read light Br irradiated on the disc DSC can be set at an appropriate power.

Now, the principle that yields the foregoing effects will be described with reference to FIG. 2.

Assume that the S-polarized laser light B1 is $P_{B1}$ in power when the S-polarized laser light B1 has the ideal wavelength $\lambda$. Then, the partial transmitted light B3 incident on the light detecting device 7 through the half mirror 4 has the following power $P_{B3}$, wherein $P_{B3}=P_{B1}\times Ts(\lambda)$.

The reflected light B2 reflected from the half mirror 4 has the following power $P_{B2}$, wherein $P_{B2}=P_{B1}\times(1-Ts(\lambda))$.

After the reflected light B2 passes through the quarter-wave plate 5 and the objective lens 6 and incident on the disc DSC, it becomes the reflected light Bwr, Ber or return light Brr which passes through the objective lens 6 and the quarter-wavelength plate 5 again and incident on the half mirror 4 with a power of Pin. Assuming that the efficiency between the half mirror 4 and the disc DSC is η, the power Pin is shown by the equation of Pin=η×$P_{B1}$×(1−Ts(λ)).

As a result, in the ideal state where the laser light B1 does not vary in the wavelength, the partial transmitted light B3 has the power $P_{B3}$, where $P_{B3}$=$P_{B1}$×Ts(λ), and the light Bwd, Bed or Brd incident on the light receiving device 8 has the power Pd which is given by the following Eq. (2):

$$Pd=\eta \times P_{B1} \times \{1-Ts(\lambda)\} \times Tp(\lambda) \quad (2)$$

Now, if changes in environmental temperature make the semiconductor laser 2 vary to, for example, λc in the wavelength of the laser light B1, the first transmittances Ts and the second transmittance Tp of the half mirror 4 in the ideal state vary accordingly to, for example, Tsc(λc) and Tpc(λc).

More specifically, assume that the power of laser light B1 after the wavelength is varied is expressed by $P_{B1c}$. Then, the partial transmitted light B3 incident on the light detecting device 7 has a power $P_{B3c}$ of $P_{B3c}$=$P_{B1c}$×Tsc(λc).

Here, the semiconductor laser 2 is controlled in emission power through the feedback control described above, so that the power $P_{B3c}$ of the partial transmitted light B3 is kept in the relationship of the following Eq. (3).

$$P_{B3c}=P_{B1c} \times Tsc(\lambda c)=P_{B1} \times Ts(\lambda) \quad (3)$$

This relationship, therefore, further yields the relationship of the following Eq. (4).

$$P_{B1c}=P_{B1} \times Ts(\lambda)/Tsc(\lambda c) \quad (4)$$

The light Bwd, Bed or Brd incident on the light receiving device 8 has a power Pdc of Pdc=η×$P_{B1c}$×(1−Tsc(λc))×Tpc(λc). Substituting the relationship of the Eq. (4) into this equation results in the power Pdc expressed by the following Eq. (5).

$$Pdc = \eta \times P_{B1c} \times \{1 - Tsc(\lambda c)\} \times Tpc(\lambda c) \quad (5)$$
$$= \eta \times P_{B1} \times \{Ts(\lambda)/Tsc(\lambda c)\} \times \{1 - Tsc(\lambda c)\} \times Tpc(\lambda c)$$

If the foregoing Eq. (2) and Eq. (5) are equal to each other, the light Bwd, Bed or Brd incident on the light receiving device 8 is maintained at an appropriate power all the time. Thus, the following Eq. (6) is derived from Eq. (2) and Eq. (5). Developing them further, it results in the foregoing Eq. (1).

$$\eta \times P_{B1} \times \{1 - Ts(\lambda)\} \times Tp(\lambda) = \quad (6)$$
$$\eta \times P_{B1} \times \{Ts(\lambda)/Tsc(\lambda c)\} \times \{1 - Tsc(\lambda c)\} \times Tpc(\lambda c)$$

Consequently, since the half mirror 4 is formed to satisfy the condition of Eq. (1), the light Bwd received by the light receiving device 8 during the information writing, the light Bed received by the light receiving device 8 during the information erasing, and the light Brd received by the light receiving device 8 during the information reading can be maintained at respective appropriate powers all the time even if the semiconductor laser 2 varies in the wavelength of the laser light B1 depending on changes in the environmental temperature.

As a result, the foregoing effects such that various controls such as the focus servo and the tracking servo can be maintained with high accuracy based on error signals output from the light receiving device 8 can be achieved.

Incidentally, Eq. (1) shows the condition for forming a half mirror 4 of higher precision. For actual optical pickups, the condition of the following Eq. (7) has only to be satisfied to realize a half mirror 4 which is sufficient for practical use.

That is, in an actual half mirror 4, the power of the reflected light B2 with respect to the laser light B1 must be greater than that of the partial transmitted light B3 with respect to the laser light B1. Thus, it is usually conducted that the first reflectance Rs to the laser light B1 is often set at approximately 80%, and the first transmittance Ts to the laser light B1 as low as approximately 20%.

Moreover, wavelength variations resulting from actual changes in the environment cause variations in the transmittance Ts, Tp or the reflectance Rs, Rp of the half mirror 4 as small as several percent.

When the first reflectance Rs and the first transmittance Ts are determined under the circumstances, the second term of Eq. (1) on the right side, or the variable (1−Ts(λ))/(1−Tsc (λc)), approaches 1 and becomes negligible.

As a result, a half mirror 4 sufficient for practical use can be formed by satisfying the approximate expression shown by the following Eq. (7), in which the ratio of the transmittances to the reflected light Bwr, Ber or return light Brr, i.e., (Tpc(λc)/Tp(λ)) and that of the transmittances to the laser light B1, i.e., (Tsc(λc)/Ts(λ)) are equal to each other:

$$Tpc(\lambda c)/Tp(\lambda)=Tsc(\lambda c)/Ts(\lambda) \quad (7)$$

The condition of the foregoing Eq. (1) is intended to form a half mirror 4 of higher precision, and the condition of the foregoing Eq. (7) is intended to form a half mirror 4 which is practically usable without problems. The first and second transmittances Ts and Tp, and the first and second reflectance Rs, Rp of the half mirror 4 maybe determined to satisfy any condition which lies between the both ranges of Eqs. (1) and (7).

More specifically, assuming that a variable K represents the variable (1−Ts(λ)/(1−Tsc (λc)) of the second term in Eq. (1) the transmittances Ts and Tp of the half mirror 4 may be determined so as to satisfy the relationship given by the following Eq. (8):

$$Tpc(\lambda c)/Tp(\lambda)=K \times Tsc(\lambda c)/Ts(\lambda) \quad (8)$$

where the variable K is a value falling between {1−Tsc (λc)}/{1−Tsc(λc)}) and 1.

The optical pickup 1 shown in FIG. 2 has the configuration of so-called infinite design, in which the reflected light B2 that is incident on the objective lens 6 from the side of the quarter-wavelength plate 5 is rendered as parallel light. Nevertheless, the present invention is also applicable to the configuration of so-called finite design where the reflected light B2 is not rendered as parallel light when it is incident on the objective lens 6 from the side of the quarter-wavelength plate 5, as shown in a modified example of FIG. 4.

Figure 4:
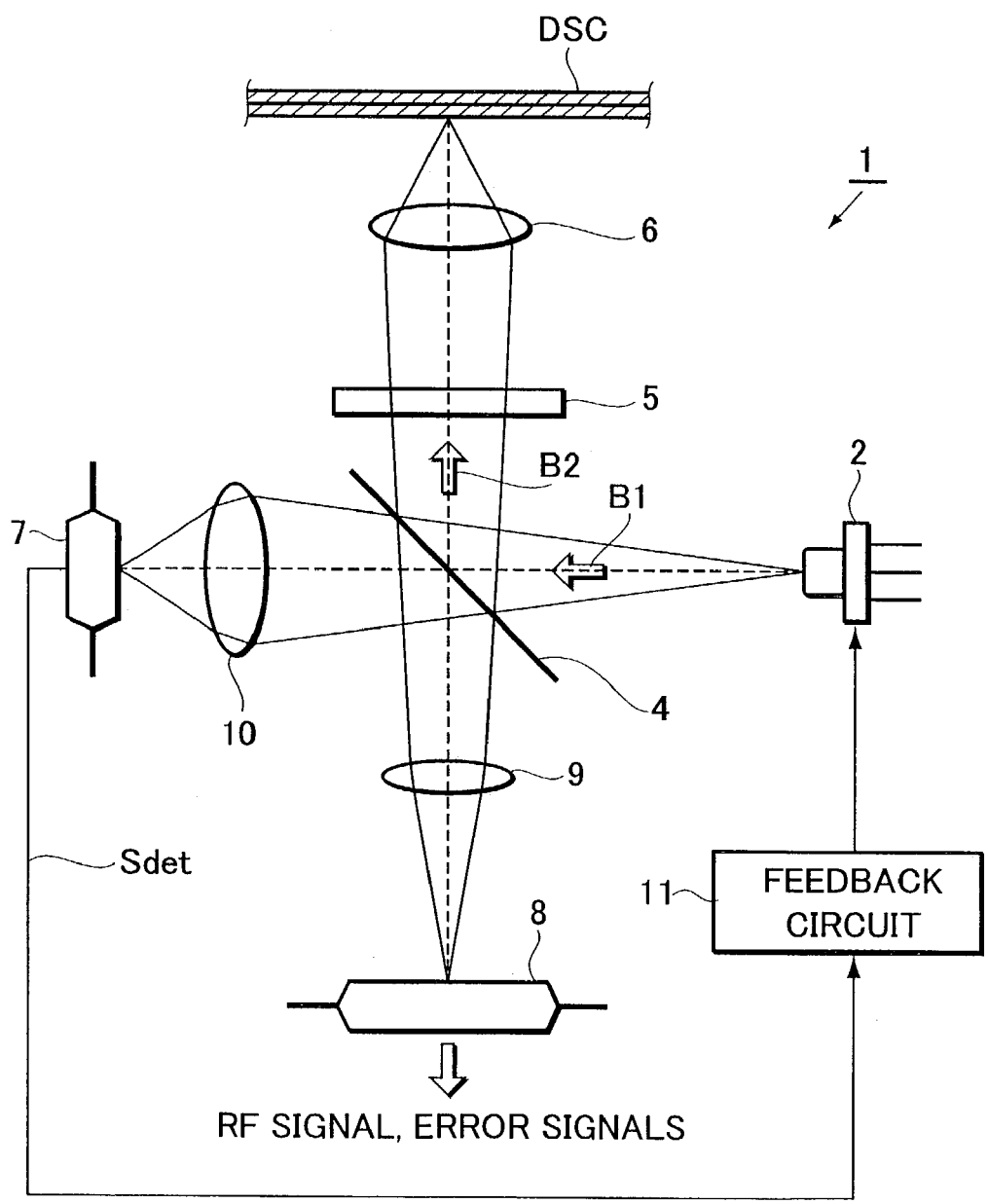
FIG. 4 is a diagram showing the configuration of an optical pickup according to a modified example of the embodiment.

In the optical pickup 1 shown in FIG. 4, the same or equivalent elements as those of FIG. 2 are designated by identical reference numerals or symbols. As with the half mirror 4 shown in FIG. 2, the transmittances Ts, Tp and the reflectance Rs, Rp of the half mirror 4 in FIG. 4 are set to satisfy the condition of Eq. (1), (7) or (8).

As has been described, the optical pickup 1 of the first embodiment including modified examples is of so-called reflection type in which the laser light B1 emitted from the semiconductor laser 2 as a light source, is reflected by the half mirror 4 so that the disc DSC is irradiated with the resulting reflected light B2 as the write light Bw, erase light Be or read light Br.

The present invention may also be applied, however, to an optical pickup of so-called transmission type in which the laser light B1 emitted from the semiconductor laser 2 as a light source, is transmitted through a half mirror so that the disc DSC is irradiated with the resulting transmitted light as the write light Bw, erase light Be or read light Br.

Figure 5:
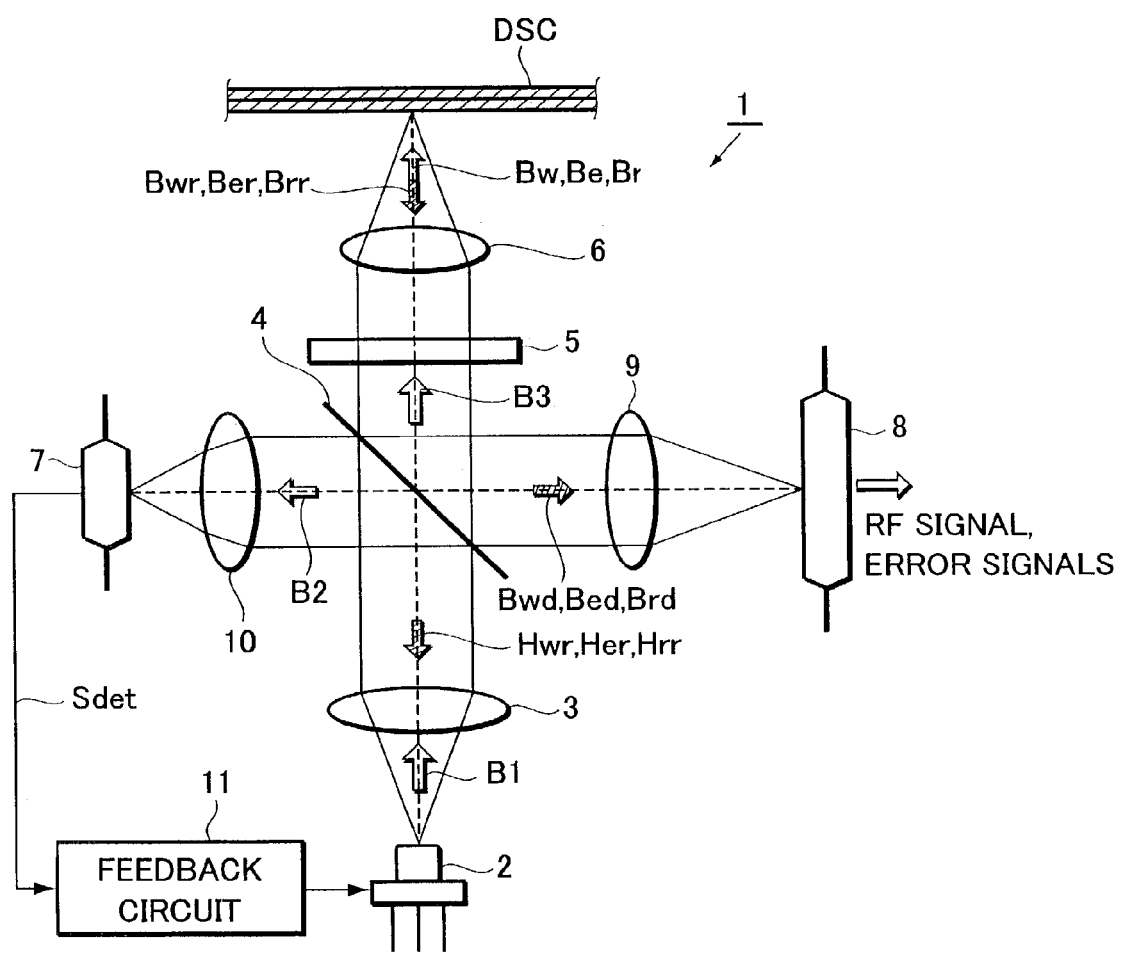
FIG. 5 is a diagram showing the configuration of an optical pickup according to another modified example of the embodiment.

That is, the present invention is also applicable to a transmission type optical pickup 1 as shown in another modified example of FIG. 5.

In FIG. 5, the same or equivalent parts as those of FIG. 2 are designated by identical reference numerals or symbols. In the transmission type optical pickup 1, a light B2 as the first reflected light which is generated by reflecting the laser light B1 through the half mirror 4 is output toward the light detecting device 7, and also a light B3 as the first transmitted light which is generated by transmitting inversely is output toward the quarter wavelength plate 5. On the other hand, as mentioned above, the light reflected by the disc DSC is incident on the half mirror 4 through the quarter wavelength plate 5. A light Bwd, Bed, Brd as the second reflected light which is generated by further reflecting the reflected light through the half mirror 4 is output toward the light receiving device 8, and a noise light Hwd, Hed, Hrd as the second transmitted light which is generated by transmitting inversely is output toward the emission end of the semiconductor laser 2.

Namely, in the optical pickup 1 shown in FIG. 5, the S-polarized laser light B1 emitted from the semiconductor laser 2 is converted into parallel light through the collimator lens 3 and incident on the half mirror 4. The reflected light B2 partially reflected from the half mirror 4 is detected by the light detecting device 7 through the condenser lens 10.

The transmitted light B3 transmitted through the half mirror 4 passes through the quarter-wavelength plate 5 and then converged through the objective lens 6 to generate the write light Bw, erase light Be or read light Br, with which the disc DSC is irradiated.

The reflected light Bwr generated in the information writing, the reflected light Ber generated in the information erasing or return light Brr generated in the information reading passes through the objective lens 6 and the quarter-wavelength plate 5 again, and thus incident on the half mirror 4 with P-polarization converted. The reflected light Bwr, Ber or return light Brr is reflected from the half mirror 4 to cause the light Bwd, Bed or Brd, which is received by the light receiving device 8 through the condenser lens 9.

The reflected light Bwr, Ber or return light Brr which is incident on and partially passes through the half mirror 4, i.e., the noise light Hwr, Her or Hrr is incident toward the emission end of the semiconductor laser 2.

Here, the reflectance of the half mirror 4 in FIG. 5, or the first reflectance Rs with which part of the laser light B1 is reflected toward the light detecting device 7 as the reflected light B2 and the second reflectance Rp with which the reflected light Bwr, Ber or return light Brr is reflected toward the light receiving device 8 as the light Bwd, Bed or Brd, are set to satisfy the condition given by the following Eq. (9):

$$Rpc(\lambda c)/Rp(\lambda) = \{1-Rs(\lambda)\}/\{1-Rsc(\lambda c)\} \times Rsc(\lambda c)/Rs(\lambda) \quad (9)$$

Moreover, in the foregoing Eq. (9), the coefficient $Rs(\lambda)$ is the ideal first reflectance Rs for the situation where the laser light B1 is reflected at room temperature of 25° C. Also, the coefficient $Rp(\lambda)$ is the ideal second reflectance Rp for generating the light Bwd, Bed, or Brd through reflecting the reflected light Bwr, Ber or Brr.

The variables $Rsc(\lambda c)$ and $Rpc(\lambda c)$ are the first reflectance Rs and the second reflectance Rp, respectively, for situations where the semiconductor laser 2 varies in wavelength characteristic, and the wavelength of the laser light B1 shifts to a certain wavelength $\lambda c$, for example.

Further, in order to effectively utilize most of the laser light B1 as the write light Bw, erase light Be or read light Br, the first transmittance Ts to the laser light B1 is set to be larger than the first reflectance Rs to the same. Likewise, in order not to lower the intensity of the reflected light Bwr, Ber and return light Brr which are received by the light receiving device 8, the second reflectance Rp to the lights Bwr, Ber or Brr is set to be larger than the second transmittance Tp to the same.

Then, in the foregoing reflection type optical pickup 1 as shown in FIGS. 2 and 4, after actually measuring the transmittance $Tpc(\lambda c)$ or $Tsc(\lambda c)$, the half mirror 4 satisfying the condition of the foregoing Eq. (1) is formed as explained referring to FIG. 3. On the other hand, in the transmission type optical pickup as shown in FIG. 5, instead of the transmittance $Tsc(\lambda c)$ or $Tpc(\lambda c)$, either the reflectance $Rsc(\lambda c)$ or $Rpc(\lambda c)$ is actually measured. The actually measured reflectance, for example, $Rsc(\lambda c)$ is substituted into the foregoing Eq. (9) so that the another reflectance, for example, $Rpc(\lambda c)$ can be calculated. As a result, the half mirror 4 which can suppress the effect of the wavelength variations on the half mirror 4 is formed.

Incidentally, the foregoing Eq. (9) is the condition for forming a half mirror 4 of higher precision. For actual transmission type optical pickups, the condition of the following Eq. (10) has only to be satisfied to realize a half mirror 4 which is sufficient for practical use.

More specifically, for the sake of surely conducting the information writing, information erasing, and information reading, respectively, the reflectance Ts to the laser light B1 is often set at as high as approximately 80% and the reflectance Rs to the laser light B1 at as low as approximately 20%. Moreover, wavelength variations resulting from actual changes in the environment cause the reflectance and transmittance variations of the half mirror 4 as small as several percent.

Under these circumstances, the second term of Eq. (9) on the right side, or the variable $(1-Rs(\lambda))/(1-Rsc(\lambda c))$, approaches 1 and becomes negligible.

Consequently, a half mirror 4 sufficient for practical use can be formed by satisfying the approximate expression shown by the following Eq. (10), in which the ratios of reflectances $(Rpc(\lambda c)/Rp(\lambda))$ and $(Rsc(\lambda c)/Rs(\lambda))$ are equal to each other.

$$Rpc(\lambda c)/Rp(\lambda) = Rsc(\lambda c)/Rs(\lambda) \quad (10)$$

The condition of Eq. (9) is intended to form a half mirror 4 of higher precision, and the condition of the foregoing Eq. (10) is intended to form a half mirror 4 which is practically usable without problems. The reflectances Rs and Rp of the half mirror 4 may be determined to satisfy a condition which lies between Eqs. (9) and (10).

That is, as with the transmittances Ts and Tp described with reference to Eq. (8), Eq. (9) may be written as the following Eq. (11).

$$Rpc(\lambda c)/Rp(\lambda) = K \times Rsc(\lambda c)/Rs(\lambda) \quad (11)$$

In addition, the variable K in the foregoing Eq. (11) may be set at a value falling within the range of $(1-Rs(\lambda))/(1-Rsc(\lambda c))$ and 1.

The transmittances and reflectances of the half mirror 4 have the relationships that $Rs(\lambda)=(1-Ts(\lambda))$, $Rp(\lambda)=(1-Tp$ $(\lambda)$), Rsc($\lambda$c)=(1−Tsc($\lambda$c)) and Rpc($\lambda$c)=(1−Tpc($\lambda$c)). Substituting these relationships into Eq. (9) yields the following Eq. (12).

$$\{1-Tpc(\lambda c)\}/\{1-Tp(\lambda)\}=Ts(\lambda)/Tsc(\lambda c)\times\{1-Tsc(\lambda c)\}/\{1-Ts(\lambda)\} \quad (12)$$

Consequently, instead of being designed to satisfy the condition of Eq. (9) based on the first and second reflectances Rsc($\lambda$c) and Rpc($\lambda$c) for various wavelengths of the laser light B1, the half mirror 4 may be designed to satisfy the condition of the foregoing Eq. (12) based on the first and second transmittances Tsc($\lambda$c) and Tpc($\lambda$c) for various wavelengths of the laser light B1.

Now, the optical pickup 1 shown in FIG. 5 has the configuration of so-called infinite design, in which the transmitted light B3 is rendered as a parallel light when it is incident on the objective lens 6 from the side of the quarter-wavelength plate 5. Nevertheless, the present invention may be also applied to the configuration of so-called finite design where the transmitted light B3 is not rendered as the parallel light when it is incident on the objective lens 6 from the side of the quarter-wavelength plate 5.

More specifically, in the case that such a finite design is configured, the half mirror 4 can be designed in accordance with the conditions of the foregoing Eq. (9), (10), (11), or (12).

Thus, according to the first embodiment including the modified examples, even if the wavelength of the laser light B1 from the semiconductor laser 2 varies as the environmental temperature or the like varies, the reflection type pickup 1 as shown in FIGS. 2 and 4 enables the power of the partial transmitted light B3 to always have a correlation with the power of the laser light B1. Also, the transmission type pickup 1 as shown in FIG. 5 enables the power of the partial reflected light B2 to always have a correlation with the power of the laser light B1.

Thus, when the emission power of the semiconductor laser 2 is feedback-controlled based on the detection signal Sdet which is output from the light detecting device 7, the power of the laser light B1 can be appropriately set.

Additionally, each power of the light Bwd, Bed or Brd incident on the light receiving device 8 is kept at an appropriate value, so that the accuracy of the information reproduction or various servo controls can be improved.

Further, the noise light Hwr, Her or Hrr which returns toward the emission end of the semiconductor laser 2 is P-polarized, while the laser light B1 is S-polarized, thereby enabling the adverse effect to the semiconductor laser 2 caused by the noise light Hwr, Her or Hrr to be avoided in advance.

In such a way, the above mentioned effects are obtained to realize the high accuracy of information writing, erasing or reading.

(Second Embodiment)

Figure 6:
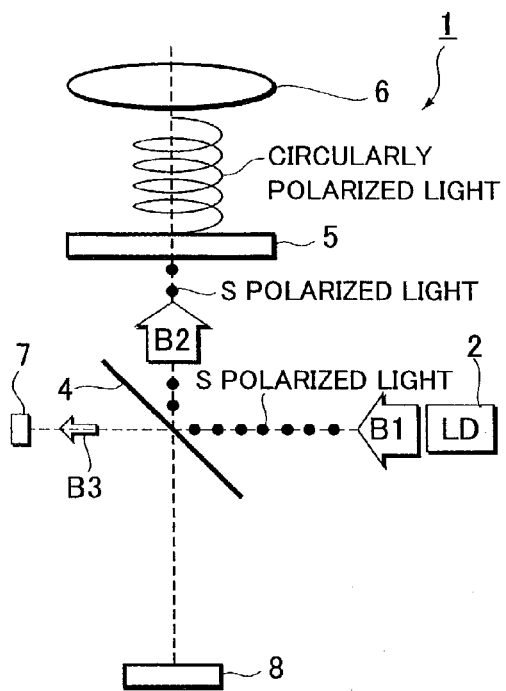
FIGS. 6(*a*), 6(*b*), 6(*c*) and 6(*d*) are diagrams showing the configuration of an optical pickup according to the second embodiment of the present invention, respectively.
Figure 6:
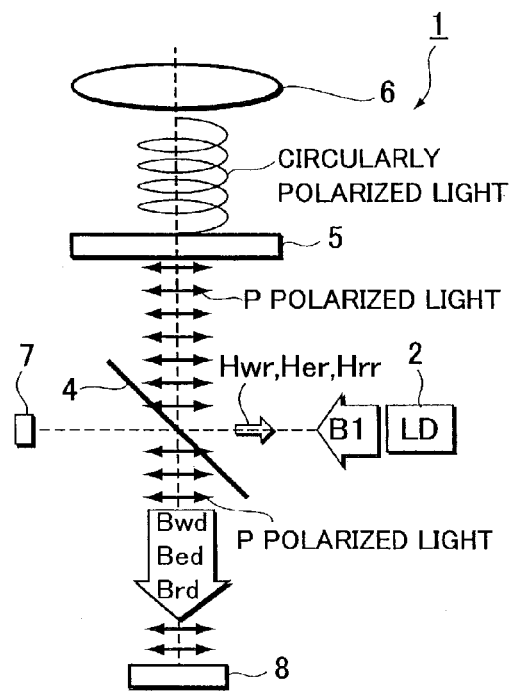
Figure 6:
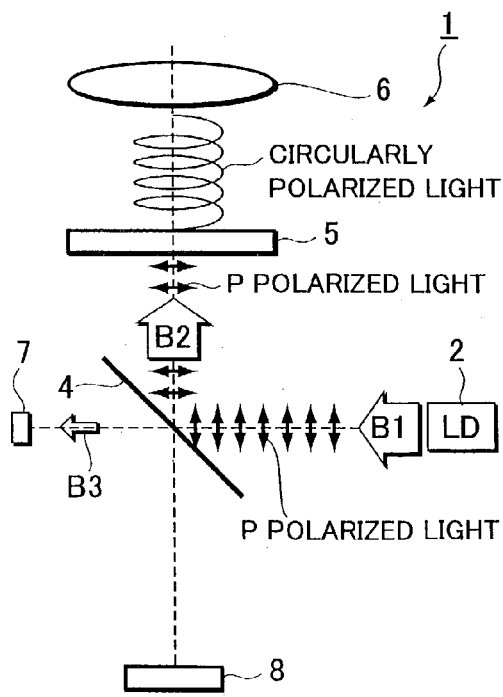
Figure 6:
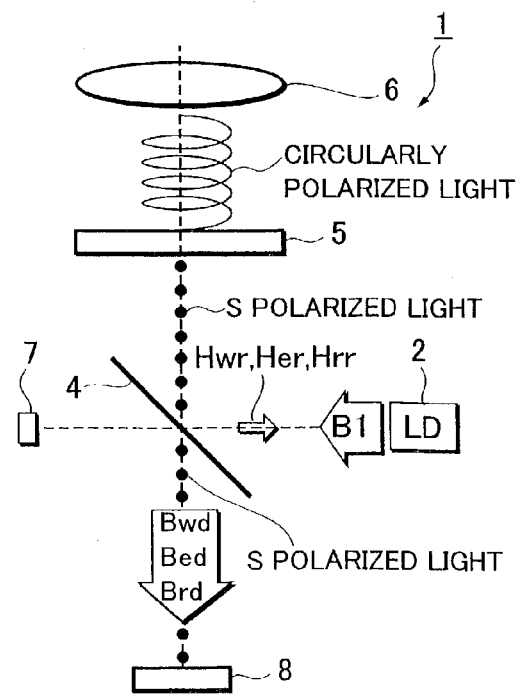

Next, the second embodiment will be explained referring to FIG. 6.

First, in the foregoing first embodiment, the S-polarized laser light B1 is emitted from the semiconductor laser 2 to the half mirror 4.

That is, in the first embodiment, explaining with the configuration as shown in, for example, FIG. 2, the S-polarized laser light B1 is incident on the incident plane of the half mirror 4, and the S-polarized reflected light B2 further being reflected from the incident plane is converted into the circular-polarization by the quarter wavelength 5. The converted light is irradiated onto the disc DSC through the objective lens 6. The above mentioned flow is shown schematically in FIG. 6(a).

Additionally, as shown schematically in FIG. 6(b), when the circularly-polarized reflected light Bwr, Ber, or return light Brr is incident on the quarter wavelength plate 5 through the objective lens 6, the circularly-polarized lights are converted into the P-polarized lights by the quarter wavelength plate 5. The light receiving device 8 receives the P-polarized lights Bwd, Bed or Brd transmitted through the half mirror 4, so that the optical pickup can be configured to output the RF signals or various error signals.

On the contrary, the second embodiment basically has the same configuration as one of FIG. 2, or FIGS. 4 and 5 as modified examples. However, it is characterized in that a P-polarized laser light B1 is emitted from the semiconductor laser 2 to the half mirror 4 to conduct the information writing, erasing or reading.

That is, as shown schematically in FIG. 6(C) which corresponds to FIG. 2 and FIGS. 6(a), 6(b), when conducting the information writing, erasing or reading, the P-polarized laser light B1 is emitted from the semiconductor 2 with the power being controlled based on the power strategy, and is incident on the incident plane of the half mirror 4.

Moreover, in FIG. 6(c), the disc DSC, the collimator lens 3, and condenser lens 9, 10 are omitted for schematically showing.

The P-polarized reflected light B2 which is reflected from the incident plane of the half mirror 4 is converted into the circularly-polarized light. The foregoing disc DSC is irradiated with the converted light through the objective lens 6.

Additionally, as shown schematically in FIG. 6(d), when the circularly-polarized reflected lights Bwr, Ber or return light Brr which are reflected back from the disc DSC is incident on the quarter wavelength plate 5 through the objective lens 6, the lights are converted into the S-polarized lights by the quarter wavelength plate 5. The light receiving device 8 receives the S-polarized lights Bwd, Bed or Brd transmitted through the half mirror 4, so that the RF signals or various error signals can be output.

That is, the optical pickup 1 as shown in FIGS. 6(c), 6(d) is a reflection type pickup having the same configuration as ones of FIG. 2 or 4 as explained for the first embodiment, but note that the P-polarized laser light B1 is incident on the incident plane of the half mirror 4.

In addition, the half mirror 4 is designed based on the any condition of the following Eq. (13) corresponding to the foregoing Eq. (1), the following Eq. (14) corresponding to the foregoing Eq. (7), the following Eq. (15) corresponding to the foregoing Eq. (8). Specifically, the predetermined first reflectance Rp and first transmittance Tp are provided to the P-polarized laser light B1, and also the predetermined second reflectance Rs and second transmittance Ts are provided to the S-polarized reflected lights Bwr, Ber or return light Brr.

$$Tsc(\lambda c)/Ts(\lambda)=\{1-Tp(\lambda)\}/\{1-Tpc(\lambda c)\}\times Tpc(\lambda c)/Tp(\lambda) \quad (13)$$

$$Tsc(\lambda c)/Ts(\lambda)=Tpc(\lambda c)/Tp(\lambda) \quad (14)$$

$$Tsc(\lambda c)/Ts(\lambda)=K\times Tpc(\lambda c)/Tp(\lambda) \quad (15)$$

Note that the coefficients Tp($\lambda$) and Ts($\lambda$) in the Eqs. (13), (14), (15) are the first transmittance Tp and the second transmittance Ts which are the ideal transmittances determined by the design specifications. Further, the variables Tpc($\lambda$c) and Tsc($\lambda$c) are the first transmittance Tp and the second transmittance Ts obtained when the laser light B1 varies in wavelength to become, for example, a certain wavelength λc.

Also, the variable K in the foregoing Eq. (15) is set at a value falling within the range of $(1-Tp(\lambda))/(1-Tpc(\lambda c))$ and 1.

By the same method as the explanation referring to FIG. 3, the variable $Tpc(\lambda c)$ or $Tsc(\lambda c)$ is actually measured, and the half mirror 4 satisfying the any condition among the Eqs. (13), (14) and (15) is formed.

According to the second embodiment having such a configuration, which includes a plurality of modified examples, even if the wavelength of the P-polarized laser light B1 varies in accordance with the variation of the environmental temperature or the like, the power of the partial transmitted light B3 can be set to have a correlation with the power of the laser light B1 like the first embodiment.

Thus, when the emission power of the semiconductor laser 2 is feedback-controlled based on the detection signal Sdet which is output from the light detecting device 7, the power of the laser light B1 can be set appropriately.

Additionally, each power of the light Bwd, Bed or Brd incident on the light receiving device 8 is kept at an appropriate value, so that the accuracy of the information reproduction or various servo controls can be improved.

Further, the noise light Hwr, Her or Hrr which returns toward the emission end of the semiconductor laser 2 is S-polarized, while the laser light B1 is P-polarized, thereby enabling the adverse effect to the semiconductor laser 2 caused by the noise light Hwr, Her or Hrr to be avoided in advance.

In such a way, the above mentioned effects are obtained to realize the high accuracy of information writing, erasing or reading.

Moreover, the above mentioned explanation uses the reflection type optical pickup 1 having the same configuration as ones of FIGS. 2 and 4, but the basic principle of the present embodiment can be applied to the transmission type optical pickup having the same configuration as one of FIG. 5.

That is, in the case that the transmission type optical pickup having the same configuration as one of FIG. 5 is formed, the P-polarized laser light B1 and the S-polarized reflected light Bwd, Bed or return light Brd is incident on the half mirror 4. The transmittance and the reflectance of the half mirror 4 are determined based on any condition of the following Eqs. (16)–(19) corresponding to the foregoing Eqs. (9)–(12), so that the transmission type optical pickup utilizing the P-polarized laser light B1 can be brought about.

$$Rsc(\lambda c)/Rs(\lambda) = \{1-Rp(\lambda)\}/\{1-Rpc(\lambda c)\} \times Rpc(\lambda c)/Rp(\lambda) \quad (16)$$

$$Rsc(\lambda c)/Rs(\lambda) = Rpc(\lambda c)/Rp(\lambda) \quad (17)$$

$$Rsc(\lambda c)/Rs(\lambda) = K \times Rpc(\lambda c)/Rp(\lambda) \quad (18)$$

$$\{1-Tsc(\lambda c)\}/\{1-Ts(\lambda)\} = Tp(\lambda)/Tpc(\lambda c) \times \{1-Tpc(\lambda c)\}/\{1-Tp(\lambda)\} \quad (19),$$

where the coefficient $Rp(\lambda)$ is an ideal first reflectance Rp in reflecting part of the laser light B1 as the reflected light B2 toward the light detecting device 7, the coefficient $Tp(\lambda)$ is an ideal first transmittance Tp in transmitting the laser light B1, the coefficient $Rs(\lambda)$ is an ideal second reflectance Rs in reflecting the reflected light Bwr, Ber or return light Brr as the lights Bwd, Bed, Brd toward the light receiving device 8, and the coefficient $Ts(\lambda)$ is an ideal second transmittance Ts in transmitting the reflected light Bwr, Ber or return light Brr.

Further, the variables $Rpc(\lambda c)$ and $Rsc(\lambda c)$ are the first reflectance Rp and the second reflectance Rs in the situation where the wavelength of the laser light B1 varies into a certain wavelength λc, and the variables $Tpc(\lambda c)$ and $Tsc(\lambda c)$ are the first transmittance Tp and the second transmittance Ts in the same situation as mentioned above.

In the foregoing Eq. (18), the variable K is set at a value falling within the range of $(1-Rp(\lambda))/(1-Rpc(\lambda c))$ and 1.

Thus, the half mirror 4 satisfying any condition of the foregoing Eqs. (16)–(19) is provided, so that the transmission type optical pickup utilizing the P-polarized laser light B1 can be brought about.

Additionally, the present embodiment can be applied to every one of the optical pickup having the configuration of infinite design as shown in FIG. 2, the optical pickup having the configuration of finite design as shown in FIG. 4, the optical pickup having the configuration of a reflection type as shown in FIGS. 2 and 4, and the optical pickup having the configuration of a transmission type as shown in FIG. 5.

(Third Embodiment)

Figure 7:
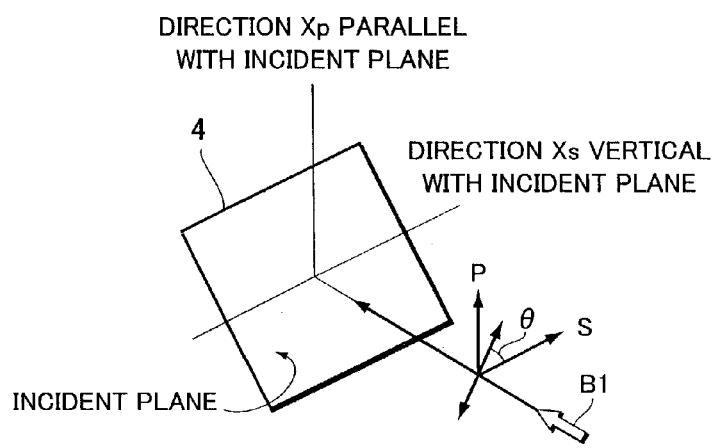
FIG. 7(*a*) is a diagram for explaining P-polarization, S-polarization and θ-polarization.
Figure 7:
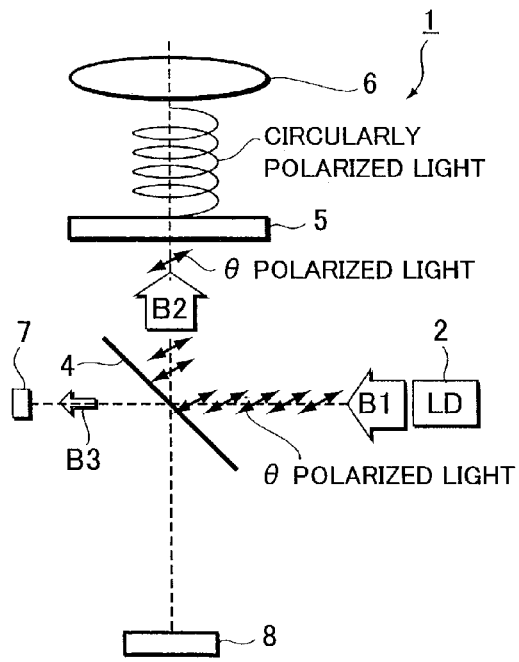
Figure 7:
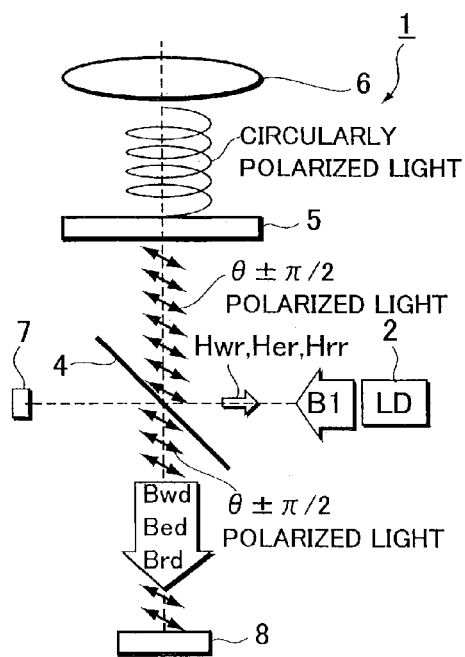

Next, the third embodiment will be explained referring to FIG. 7. The optical pickup 1 of the third embodiment also basically has any configuration of FIGS. 2, 4 and 5. Note that the optical pickup 1 is provided with the following features on configuration.

First, in the first and second embodiments including modified examples, the laser light B1 emitted from the semiconductor laser 2 is incident on the incident plane of the half mirror 4 with either characteristic of S-polarization or P-polarization.

On the other hand, in the third embodiment, the laser light B1 emitted from the semiconductor laser 2 and then incident on the incident plane of the half mirror 4 is neither the P-polarized nor S-polarized light, but is a light, of which an oscillating direction of electric vector is oblique to the incident plane of the half mirror 4.

As schematically shown in FIG. 7(a), assume that an electrostatic component of light waves which oscillates in the direction Xp parallel to the incident plane of the half mirror 4 is the P-polarization (shown with the symbol P in the same drawing), and an electrostatic component of light waves which oscillates in the direction Xs vertical to the incident plane of the half mirror 4 is the S-polarization (shown with the symbol S in the same drawing). In the present embodiment, the laser light B1, of which the oscillating direction of electric vector inclines by a predetermined angle θ to the P-polarization and the S-polarization, is emitted from the semiconductor laser 2. For example, the laser light B1, of which polarized direction θ is 45°, is emitted.

Moreover, FIG. 7(a) shows the case applied to the optical pickup 1 having the configuration of reflection type as shown in FIGS. 2 and 4, that is, the case where the incident plane of the half mirror 4 reflects almost of laser light B1 as the incident light. Even if the present embodiment is applied to the optical pickup having the configuration of the transmission type, that is, the incident plane of the half mirror 4 transmits almost of the laser light B1 as the incident light, the laser light B1, of which the oscillating direction of electric vector inclines by the predetermined angle θ to the P-polarization and the S-polarization, can be emitted from the semiconductor laser 2.

Moreover, for convenience of explanation, FIG. 7(a) shows the case where the laser lights B1 oscillating in the directions of P-polarization and S-polarization crossed at right angles each other, under the direction of the first and third quadrants, are utilized. The direction of the oscillation is within the range of $0<\theta<\pi/2$ and $\pi<\theta<3\pi/2$ in the case that the S-polarization is used as the standard. Additionally, it is also possible to utilize the laser light B1 oscillating in the directions of the second and fourth quadrants between the P-polarization and S-polarization, in which the direction of the oscillation is within the range of $\pi/2<\theta<\pi$ and $3\pi/2<\theta<2\pi$ in the case that the S-polarization is used as the standard.

Next, the configuration of the optical pickup 1 in the present embodiment, in which the laser light B1 having the inclined polarization direction as mentioned above is utilized, will be explained referring to FIGS. 7(b) and 7(c).

Moreover, FIGS. 7(b) and 7(c) show the reflection type optical pickup 1 having the same configuration as FIGS. 2 and 4, in which the disc DSC, the collimator lens 3, and condenser lens 9, 10 are omitted for schematically showing.

Note that we will call hereinafter the laser light B1, the polarized direction of which inclines to the incident plane of the half mirror 4, an obliquely polarized laser light or a $\theta$-polarized laser light.

In FIG. 7(b), in writing, erasing or reading information, the present optical pickup 1 emits the $\theta$-polarized laser light B1 having the power controlled based on the power strategy from the semiconductor laser 2, and then the laser light B1 is incident on the incident plane of the half mirror 4.

Next, the $\theta$-polarized reflected light B2 which is reflected from the incident plane of the half mirror 4 is converted into the circular polarization by the quarter wavelength plate 5, and then the resultant is irradiated onto the disc DSC through the objective lens 6.

Moreover, the quarter wavelength plate 5 is rotated by 45° or −45° to the $\theta$-polarized direction as mentioned above in a crystal orientation thereof. As a result, the $\theta$-polarized reflected light B2 can be converted into the circular polarization.

In addition, as schematically shown in FIG. 7(c), in writing, erasing or reading information mentioned above, the circularly-polarized reflected light Bwr, Ber or return light Brr is incident on the quarter wavelength plate 5 through the objective lens 6. At the quarter wavelength plate 5, the light is converted into a $\theta\pm\pi/2$ polarization, and the $\theta\pm\pi/2$ polarized light Bwd, Bed, Brd is received by the light receiving device 8 after passing through the half mirror 4 to output the RF signal and various error signals.

Here, the $\theta\pm\pi/2$ polarization represents a polarization which deviates from the $\theta$-polarization by the angle $\pi/2$ or $-\pi/2$. Further, as the foregoing, the crystal orientation of the quarter wavelength plate 5 is rotated by 45° or −45° with regard to the $\theta$-polarized direction of the laser light B1. As a result, the circularly-polarized reflected light Bwr, Ber or return light Brr is converted into the $\theta\pm\pi/2$ polarization.

Further, the half mirror 4 is designed based on any conditional expression of the following Eqs. (20), (21) and (22) which correspond to the foregoing Eqs. (1), (7) and (8) explaining with correspondence to configurations of FIG. 2 or 4. The $\theta$-polarized laser light B1 is provided with the predetermined first transmittance $T_1$ and the first reflectance $R_1$, and also the $\theta\pm\pi/2$ polarized reflected light Bwr, Ber, or return light Brr is provided with the predetermined second transmittance $T_2$ and the second reflectance $R_2$.

$$T_{2c}(\lambda c)/T_2(\lambda)=\{1-T_1(\lambda)\}/\{1-T_{1c}(\lambda c)\}\times T_{1c}(\lambda c)/T_1(\lambda) \quad (20)$$

$$T_{2c}(\lambda c)/T_2(\lambda)=T_{1c}(\lambda c)/T_1(\lambda) \quad (21)$$

$$T_{2c}(\lambda c)/T_2(\lambda)=K\times T_{1c}(\lambda c)/T_1(\lambda) \quad (22)$$

In the foregoing Eqs. (20) to (22), the coefficients $T_1(\lambda)$ and $T_2(\lambda)$ are the ideal first transmittance $T_1$ and the ideal second transmittance $T_2$ determined according to the design specification, and also the variables $T_{1c}(\lambda c)$ and $T_{2c}(\lambda c)$ are the first transmittance $T_1$ and the second transmittance $T_2$ in the case where the semiconductor laser 2 varies in the wavelength characteristic, and thus the wavelength of the laser light B1 becomes a certain wavelength $\lambda c$.

In addition, the variable K in the foregoing Eq. (22) is set at a value falling within the range of $(1-T_1(\lambda))/(1-T_{1c}(\lambda c))$ and 1.

By the same method as the explanation referring to FIG. 3, the variable $T_{1c}(\lambda c)$ or $T_{2c}(\lambda c)$ is actually measured, and the half mirror 4 satisfying the any condition among the Eqs. (20) to (22) is formed.

According to the third embodiment having such a configuration, which includes a plurality of modified examples, even if the wavelength of the laser light B1 of the semiconductor laser 2 varies in accordance with the variation of the environmental temperature or the like, the power of the partial transmitted light B3 can be set to have a correlation with the power of the laser light B1 like the first and second embodiments.

Thus, when the emission power of the semiconductor laser 2 is feedback-controlled based on the detection signal Sdet which is output from the light detecting device 7, the power of the laser light B1 can be set appropriately.

Additionally, each power of the light Bwd, Bed or Brd incident on the light receiving device 8 is kept at an appropriate value, so that the accuracy of the information reproduction or various servo controls can be improved.

Further, the noise light Hwr, Her or Hrr which returns toward the emission end of the semiconductor laser 2 is $\theta\pm\pi/2$ polarized, while the laser light B1 is $\theta$-polarized, thereby enabling the adverse effect to the semiconductor laser 2 caused by the noise light Hwr, Her or Hrr to be avoided in advance.

In such a way, the above mentioned effects are obtained to realize the high accuracy of information writing, erasing or reading.

Moreover, the above mentioned explanation uses the reflection type optical pickup 1 having the same configuration as ones of FIGS. 2 and 4, but the basic principle of the present embodiment can be applied to the transmission type optical pickup having the same configuration as one of FIG. 5.

That is, in the case that the transmission type optical pickup having the same configuration as one of FIG. 5 is formed, the half mirror 4 is designed based on any condition of the following Eqs. (23)–(26) corresponding to the foregoing Eqs. (9)–(12), so that the transmission type optical pickup utilizing the obliquely-polarized laser light B1 can be brought about.

$$R_{2c}(\lambda c)/R_2(\lambda)=\{1-R_1(\lambda)\}/\{1-R_{1c}(\lambda c)\}\times R_{1c}(\lambda c)/R_1(\lambda) \quad (23)$$

$$R_{2c}(\lambda c)/R_2(\lambda)=R_{1c}(\lambda c)/R_1(\lambda) \quad (24)$$

$$R_{2c}(\lambda c)/R_2(\lambda)=K\times R_{1c}(\lambda c)/R_1(\lambda) \quad (25)$$

$$\{1-T_{2c}(\lambda c)\}/\{1-T_2(\lambda)\}=T_1(\lambda)/T_{1c}(\lambda c)\times\{1-T_{1c}(\lambda c)\}/\{1-T_1(\lambda)\} \quad (26)$$

where the coefficient $R_1(\lambda)$ is an ideal first reflectance $R_1$ in reflecting the laser light B1 as the reflected light B2 toward the light detecting device 7, the coefficient $T_1(\lambda)$ is an ideal first transmittance $T_1$ in transmitting the laser light B1, the coefficient $R_2(\lambda)$ is an ideal second reflectance $R_2$ in reflecting the reflected light Bwr, Ber or return light Brr as the lights Bwd, Bed, Brd toward the light receiving device 8, and the coefficient $T_2(\lambda)$ is an ideal second transmittance $T_2$ in transmitting the reflected light Bwr, Ber or return light Brr.

Further, the variables $R_{1c}(\lambda c)$ and $R_{2c}(\lambda c)$ are the first reflectance $R_1$ and the second reflectance $R_2$ in the situation where the wavelength of the laser light B1 varies into a certain wavelength $\lambda c$, and the variables $T_{1c}(\lambda c)$ and $T_{2c}(\lambda c)$ are the first transmittance $T_1$ and the second transmittance $T_2$ in the same situation as mentioned above.

In the foregoing Eq. (25), the variable K is set at a value falling within the range of $(1-R_1(\lambda))/(1-R_{1c}(\lambda c))$ and 1.

By the same method as the explanation referring to FIG. 3, the variable $R_{1c}(\lambda c)$ or $R_{2c}(\lambda c)$ is actually measured, and the half mirror 4 satisfying the any condition among the Eqs. (23)–(26) is formed.

Thus, the transmission type optical pickup utilizing the obliquely-polarized laser light B1 can be brought about.

Additionally, the present embodiment can be applied to every one of the optical pickup having the configuration of infinite design as shown in FIG. 2, the optical pickup having the configuration of finite design as shown in FIG. 4, the optical pickup having the configuration of a reflection type as shown in FIGS. 2 and 4, the optical pickup having the configuration of a transmission type as shown in FIG. 5.

As mentioned above with the foregoing Eqs. (1)–26), according to the optical pickup 1 of the first to third embodiments including modified examples, the half mirror 4 is designed in accordance with predetermined conditions based on the following transmittances and reflectances. That is, they are the first transmittance and the first reflectance to the laser light B1 with the predetermined polarization emitted from the semiconductor laser 2, the second transmittance and the second reflectance to the reflected lights Bwr, Ber or return light Brr which is reflected back from the information recording medium DSC when the laser light B1 is emitted, the first transmittance and the first reflectance to the laser light B1 with the wavelength $\lambda c$ emitted when the wavelength characteristic of the semiconductor laser 2 varies, and the second transmittance and the second reflectance to the reflected light Bwr, Ber or return light Brr which is reflected back from the information recording medium DSC when the laser light B1 with the wavelength $\lambda c$ is emitted. Thus, if the emission power of the semiconductor laser 2 is feedback-controlled based on the detection signal Sdet being output from the light detecting device 7 even when the wavelength of the laser light B1 varies, the laser light B1 can be appropriately set in power, so that the power of the write light Bw, erase light Be, read light Br can be kept appropriately.

Further, each power of the light Bwd, Bed, Brd incident on the light receiving device 8 can be also kept at an appropriate value, so that the accuracy of information reproduction and various servo controls can be improved.

In addition, with the quarter wavelength plate 4 provided, the polarization of the noise lights Hwr, Her, Hrr returned toward the emission end of the semiconductor laser 2 can be differentiated from the polarization of the laser light B1, thereby avoiding the adverse effect to the semiconductor laser 2 in advance.

With these effects obtained in the present invention, the high accuracy in writing, erasing and reading information can be brought about.

Of course, in the first to third embodiments, including modified examples, as mentioned above, all the conditions of Eqs. (1)–(26) need not be satisfied for all the wavelengths. In other words, the foregoing conditions maybe satisfied only for a wavelength region where the actual variation of wavelength occurs, or only for a wavelength region where a predetermined performance is requested on design.

The foregoing has a assumption that the semiconductor laser 2 itself emits the laser light B1 with P-polarization, S-polarization or oblique polarization, but the present invention is not limited to this case.

That is, the semiconductor laser for emitting any laser light of P-polarized, S-polarized or obliquely polarized light may be utilized as a light source, in which an optical axis of the emission end of the semiconductor laser is adjusted to the incident plane of the half mirror 4 of each embodiment. Additionally, the emission end is circumferentially rotated about the optical axis to adjust the angle. In such a way, the semiconductor laser 2 which can emit all of the P-polarized, S-polarized and obliquely polarized laser light B1 to the half mirror 4 may be brought about.

In other words, for example, rotating the semiconductor laser 2 for emitting the P-polarized laser light B1 may bring about the semiconductor laser 2 emitting S-polarized laser light B1, or the semiconductor laser 2 emitting obliquely-polarized laser light B1.

While the present invention has been described in connection with the preferred specific embodiments thereof, it will be understood that the description is intended to illustrate and not limit the scope of the present invention, which is defined by the following claims.

What is claimed is:

1. An optical pickup comprising:
   a light source for emitting S-polarized light intended for writing, reading or erasing information;
   a beam splitter for reflecting and transmitting said S-polarized light incident at an incident plane thereof from said light source in accordance with a predetermined first reflectance and first transmittance, thereby outputting a first reflected light and a first transmitted light;
   a quarter-wavelength plate for causing said first reflected light to pass through and to be output toward an information recording medium;
   detecting means for detecting said first transmitted light to exercise a feedback control on emission power of said light source based on a result of detection; and
   light receiving means for receiving light reflected back from said information recording medium, passing through said quarter-wavelength plate again, and transmitted through said beam splitter, as said first reflected light is incident on said information recording medium through said quarter-wavelength plate,
   wherein said beam splitter has said first transmittance and a predetermined second transmittance to the light reflected back from said information recording medium, the respective transmittances being determined in accordance with a condition given by:

$Tpc(\lambda c)/Tp(\lambda)=K\times(Tsc(\lambda c)/Ts(\lambda))$, where $Ts(\lambda)$ is a transmittance to light of predetermined wavelength $\lambda$ emitted from said light source, $Tsc(\lambda c)$ is a transmittance to light of wavelength $\lambda c$ emitted when said light source varies in wavelength characteristic, $Tp(\lambda)$ is a transmittance to the light reflected back from said information recording medium through said quarter wavelength plate when the light of predetermined wavelength λ is emitted from said light source, Tpc(λc) is a transmittance to the light reflected back from said information recording medium through said quarter wavelength plate when the light of wavelength λc is emitted from said light source varying in wavelength characteristic, and K is a predetermined variable which is either 1 or a value of $(1-Ts(\lambda))/(1-Tsc(\lambda c))$, or a value falling within a range of 1 and $(1-Ts(\lambda))/(1-Tsc(\lambda c))$.

2. The optical pickup according to claim 1, wherein said light receiving means photoelectrically converts said received light to output an electric signal including information of said information recording medium.

3. The optical pickup according to claim 1, wherein said quarter wavelength plate converts said first reflected light into a circular polarization, and the circularly-polarized light reflected back from said information recording medium into a linear-polarization.

4. The optical pickup according to claim 3, wherein said light receiving means photoelectrically converts said received light to output an electric signal including information of said information recording medium.

5. An optical pickup comprising:
a light source for emitting S-polarized light intended for writing, reading or erasing information;
a beam splitter for reflecting and transmitting said S-polarized light incident at an incident plane thereof from said light source in accordance with a predetermined first reflectance and first transmittance, thereby outputting a first reflected light and a first transmitted light;
a quarter-wavelength plate for causing said first transmitted light to pass through and to be output toward an information recording medium;
detecting means for detecting said first reflected light to exercise a feedback control on emission power of said light source based on a result of detection; and
light receiving means for receiving light reflected back from said information recording medium, passing through said quarter-wavelength plate again, and reflected through said beam splitter, as said first transmitted light is incident on said information recording medium through said quarter-wavelength plate,
wherein said beam splitter has said first reflectance and a predetermined second reflectance to the light reflected back from said information recording medium, the respective reflectances being determined in accordance with a condition given by:

$Rpc(\lambda c)/Rp(\lambda)=K \times (Rsc(\lambda c)/Rs(\lambda))$, where Rs(λ) is a transmittance to light of predetermined wavelength λ emitted from said light source, Rsc(λc) is a transmittance to light of wavelength λc emitted when said light source varies in wavelength characteristic, Rp(λ) is a transmittance to the light reflected back from said information recording medium through said quarter wavelength plate when the light of predetermined wavelength λ is emitted from said light source, Rpc(λc) is a transmittance to the light reflected back from said information recording medium through said quarter wavelength plate when the light of wavelength λc is emitted from said light source varying in wavelength characteristic, and K is a predetermined variable which is either 1 or a value of $(1-Rs(\lambda))/(1-Rsc(\lambda c))$, or a value falling within a range of 1 and $(1-Rs(\lambda))/(1-Rsc(\lambda c))$.

6. The optical pickup according to claim 5, wherein said light receiving means photoelectrically converts said received light to output an electric signal including information of said information recording medium.

7. The optical pickup according to claim 5, wherein said quarter wavelength plate converts said first transmitted light into a circular polarization, and the circularly-polarized light reflected back from said information recording medium into a linear-polarization.

8. The optical pickup according to claim 7, wherein said light receiving means photoelectrically converts said received light to output an electric signal including information of said information recording medium.

9. An optical pickup comprising:
a light source for emitting P-polarized light intended for writing, reading or erasing information;
a beam splitter for reflecting and transmitting said P-polarized light incident at an incident plane thereof from said light source in accordance with a predetermined first reflectance and first transmittance, thereby outputting a first reflected light and a first transmitted light;
a quarter-wavelength plate for causing said first reflected light to pass through and to be output toward an information recording medium;
detecting means for detecting said first transmitted light to exercise a feedback control on emission power of said light source based on a result of detection; and
light receiving means for receiving light reflected back from said information recording medium, passing through said quarter-wavelength plate again, and transmitted through said beam splitter, as said first reflected light is incident on said information recording medium through said quarter-wavelength plate,
wherein said beam splitter has said first transmittance and a predetermined second transmittance to the light reflected back from said information recording medium, the respective transmittances being determined in accordance with a condition given by:

$Tsc(\lambda c)/Ts(\lambda)=K \times (Tpc(\lambda c)/Tp(\lambda))$, where Tp(λ) is a transmittance to light of predetermined wavelength λ emitted from said light source, Tpc(λc) is a transmittance to light of wavelength λc emitted when said light source varies in wavelength characteristic, Ts(λ) is a transmittance to the light reflected back from said information recording medium through said quarter wavelength plate when the light of predetermined wavelength λ is emitted from said light source, Tsc(λc) is a transmittance to the light reflected back from said information recording medium through said quarter wavelength plate when the light of wavelength λc is emitted from said light source varying in wavelength characteristic, and K is a predetermined variable which is either 1 or a value of $(1-Tp(\lambda))/(1-Tpc(\lambda c))$, or a value falling within a range of 1 and $(1-Tp(\lambda))/(1-Tpc(\lambda c))$.

10. The optical pickup according to claim 9, wherein said light receiving means photoelectrically converts said received light to output an electric signal including information of said information recording medium.

11. The optical pickup according to claim 9, wherein said quarter wavelength plate converts said first reflected light into a circular polarization, and the circularly-polarized light reflected back from said information recording medium into a linear-polarization.

12. The optical pickup according to claim 11, wherein said light receiving means photoelectrically converts said received light to output an electric signal including information of said information recording medium.

13. An optical pickup comprising:
a light source for emitting P-polarized light intended for writing, reading or erasing information;
a beam splitter for reflecting and transmitting said P-polarized light incident at an incident plane thereof from said light source in accordance with a predetermined first reflectance and first transmittance, thereby outputting a first reflected light and a first transmitted light;
a quarter-wavelength plate for causing said first transmitted light to pass through and to be output toward an information recording medium;
detecting means for detecting said first reflected light to exercise a feedback control on emission power of said light source based on a result of detection; and
light receiving means for receiving light reflected back from said information recording medium, passing through said quarter-wavelength plate again, and reflected through said beam splitter, as said first transmitted light is incident on said information recording medium through said quarter-wavelength plate,
wherein said beam splitter has said first reflectance and a predetermined second reflectance to the light reflected back from said information recording medium, the respective reflectances being determined in accordance with a condition given by:

$$Rsc(\lambda c)/Rs(\lambda) = K \times (Rpc(\lambda c)/Rp(\lambda)),$$

where $Rp(\lambda)$ is a transmittance to light of predetermined wavelength $\lambda$ emitted from said light source, $Rpc(\lambda c)$ is a transmittance to light of wavelength $\lambda c$ emitted when said light source varies in wavelength characteristic, $Rs(\lambda)$ is a transmittance to the light reflected back from said information recording medium through said quarter wavelength plate when the light of predetermined wavelength $\lambda$ is emitted from said light source, $Rsc(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-Rp(\lambda))/(1-Rpc(\lambda c))$, or a value falling within a range of 1 and $(1-Rp(\lambda))/(1-Rpc(\lambda c))$.

14. The optical pickup according to claim 13, wherein said light receiving means photoelectrically converts said received light to output an electric signal including information of said information recording medium.

15. The optical pickup according to claim 13, wherein said quarter wavelength plate converts said first transmitted light into a circular polarization, and the circularly-polarized light reflected back from said information recording medium into a linear-polarization.

16. The optical pickup according to claim 15, wherein said light receiving means photoelectrically converts said received light to output an electric signal including information of said information recording medium.

17. An optical pickup comprising:
a light source for emitting obliquely-polarized light intended for writing, reading or erasing information;
a beam splitter for reflecting and transmitting said obliquely-polarized light incident at an incident plane thereof from said light source in accordance with a predetermined first reflectance and first transmittance, thereby outputting a first reflected light and a first transmitted light;
a quarter-wavelength plate for causing said first reflected light to pass through and to be output toward an information recording medium;
detecting means for detecting said first transmitted light to exercise a feedback control on emission power of said light source based on a result of detection; and
light receiving means for receiving light reflected back from said information recording medium, passing through said quarter-wavelength plate again, and transmitted through said beam splitter, as said first reflected light is incident on said information recording medium through said quarter-wavelength plate,
wherein said beam splitter has said first transmittance and a predetermined second transmittance to the light reflected back from said information recording medium, the respective transmittances being determined in accordance with a condition given by:

$$T_{2c}(\lambda c)/T_2(\lambda) = K \times (T_{1c}(\lambda c)/T_1(\lambda)),$$

where $T_1(\lambda)$ is a transmittance to light of predetermined wavelength $\lambda$ emitted from said light source, $T_{1c}(\lambda c)$ is a transmittance to light of wavelength $\lambda c$ emitted when said light source varies in wavelength characteristic, $T_2(\lambda)$ is a transmittance to the light reflected back from said information recording medium through said quarter wavelength plate when the light of predetermined wavelength $\lambda$ is emitted from said light source, $T_{2c}(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-T_1(\lambda))/(1-T_{1c}(\lambda c))$, or a value falling within a range of 1 and $(1-T_1(\lambda))/(1-T_{1c}(\lambda c))$.

18. The optical pickup according to claim 17, wherein said light receiving means photoelectrically converts said received light to output an electric signal including information of said information recording medium.

19. The optical pickup according to claim 17, wherein said quarter wavelength plate converts said first reflected light into a circular polarization, and the circularly-polarized light reflected back from said information recording medium into a linear-polarization.

20. The optical pickup according to claim 19, wherein said light receiving means photoelectrically converts said received light to output an electric signal including information of said information recording medium.

21. An optical pickup comprising:
a light source for emitting obliquely-polarized light intended for writing, reading or erasing information;
a beam splitter for reflecting and transmitting said obliquely-polarized light incident at an incident plane thereof from said light source in accordance with a predetermined first reflectance and first transmittance, thereby outputting a first reflected light and a first transmitted light;
a quarter-wavelength plate for causing said first transmitted light to pass through and to be output toward an information recording medium;
detecting means for detecting said first reflected light to exercise a feedback control on emission power of said light source based on a result of detection; and
light receiving means for receiving light reflected back from said information recording medium, passing through said quarter-wavelength plate again, and reflected through said beam splitter, as said first transmitted light is incident on said information recording medium through said quarter-wavelength plate,
wherein said beam splitter has said first reflectance and a predetermined second reflectance to the light reflected back from said information recording medium, the respective reflectances being determined in accordance with a condition given by:

$$R_{2c}(\lambda c)/R_2(\lambda) = K \times (R_{1c}(\lambda c)/R_1(\lambda)),$$

where $R_1(\lambda)$ is a transmittance to light of predetermined wavelength $\lambda$ emitted from said light source, $R_{1c}(\lambda c)$ is a transmittance to light of wavelength $\lambda c$ emitted when said light source varies in wavelength characteristic, $R_2(\lambda)$ is a transmittance to the light reflected back from said information recording medium through said quarter wavelength plate when the light of predetermined wavelength $\lambda$ is emitted from said light source, $R_{2c}(\lambda c)$ is a transmittance to the light reflected back from said information recording medium through said quarter wavelength plate when the light of wavelength $\lambda c$ is emitted from said light source varying in wavelength characteristic, and K is a predetermined variable which is either 1 or a value of $(1-R_1(\lambda))/(1-R_{1c}(\lambda c))$, or a value falling within a range of 1 and $(1-R_1(\lambda))/(1-R_{1c}(\lambda c))$.

22. The optical pickup according to claim 21, wherein said light receiving means photoelectrically converts said received light to output an electric signal including information of said information recording medium.

23. The optical pickup according to claim 21, wherein said quarter wavelength plate converts said first transmitted light into a circular polarization, and the circularly-polarized light reflected back from said information recording medium into a linear-polarization.

24. The optical pickup according to claim 23, wherein said light receiving means photoelectrically converts said received light to output an electric signal including information of said information recording medium.

* * * * *